US008528919B2

(12) United States Patent
Webster et al.

(10) Patent No.: US 8,528,919 B2
(45) Date of Patent: Sep. 10, 2013

(54) EXTENDABLE AND COLLAPSIBLE APPARATUS THAT SUPPORTS ATTACHABLE COMPONENTS

(75) Inventors: Rustin Webster, Huntsville, AL (US); Jeremy T. Clark, Toney, AL (US); Ryan Manning, Huntsville, AL (US)

(73) Assignee: Intuitive Research and Technology Corporation, Huntsville, AL (US)

( * ) Notice: Subject to any disclaimer, the term of this patent is extended or adjusted under 35 U.S.C. 154(b) by 464 days.

(21) Appl. No.: 12/831,599

(22) Filed: Jul. 7, 2010

(65) Prior Publication Data

US 2012/0007343 A1    Jan. 12, 2012

(51) Int. Cl.
*B62B 3/02*    (2006.01)

(52) U.S. Cl.
USPC .................. 280/79.7; 280/651; 280/79.11

(58) Field of Classification Search
USPC ............... 280/79.11, 79.2, 79.7, 651, 47.34, 280/47.35, 43.15, 43.16; 211/195, 198, 206
See application file for complete search history.

(56) References Cited

U.S. PATENT DOCUMENTS

| | | | | |
|---|---|---|---|---|
| 2,020,766 | A * | 11/1935 | Brown | 280/639 |
| 3,338,422 | A * | 8/1967 | Hickok | 211/70.5 |
| 4,315,633 | A * | 2/1982 | Boeddeker et al. | 280/79.3 |
| 5,090,725 | A * | 2/1992 | Feldner | 280/651 |
| 5,299,817 | A * | 4/1994 | Chang | 280/35 |
| 5,476,282 | A * | 12/1995 | Dahl | 280/651 |
| 5,495,951 | A * | 3/1996 | Biasini | 211/85.6 |
| 5,599,031 | A * | 2/1997 | Hodges | 280/79.11 |
| 5,806,864 | A | 9/1998 | Zielinski et al. | |
| 5,875,652 | A * | 3/1999 | Davis | 280/651 |
| 5,876,050 | A * | 3/1999 | Berger | 280/79.2 |
| 6,036,219 | A * | 3/2000 | Oefelein et al. | 280/638 |
| 6,471,078 | B2 * | 10/2002 | Pyle | 211/85.6 |
| 6,786,503 | B1 * | 9/2004 | Young | 280/656 |
| 7,419,170 | B2 * | 9/2008 | Krizan et al. | 280/79.7 |
| 7,731,221 | B2 * | 6/2010 | Bess | 280/651 |
| 7,832,574 | B1 * | 11/2010 | Sexton | 211/195 |
| 8,011,686 | B2 * | 9/2011 | Chen et al. | 280/651 |
| 8,220,824 | B2 * | 7/2012 | Chen et al. | 280/651 |
| 8,251,379 | B2 * | 8/2012 | Watzke | 280/35 |
| 2005/0103737 | A1* | 5/2005 | Paventi | 211/206 |
| 2006/0108774 | A1* | 5/2006 | Raymond | 280/651 |
| 2008/0150244 | A1* | 6/2008 | Carlei | 280/35 |
| 2009/0016699 | A1 | 1/2009 | Steelberg et al. | |
| 2009/0166999 | A1* | 7/2009 | Mason et al. | 280/651 |
| 2009/0184073 | A1* | 7/2009 | Lu | 211/85.3 |

* cited by examiner

*Primary Examiner* — Jeffrey J Restifo
(74) *Attorney, Agent, or Firm* — Venable LLP; Robert S. Babayi; Thomas A. Negley

(57) ABSTRACT

A stable extendable apparatus is provided which includes top, bottom, front and rear structures coupled together. The top and bottom structures each include at least one extendable member which defines a minimum length in a longitudinal retracted position and a maximum length in a longitudinal extended position. The front and rear structures each includes a first side support, a second side support, and an extendable cross-support to couple the first and second side supports together. Extension or retraction of the extendable cross-support changes an angle of orientation of the first side support relative to the second side support. The first rear side support, the second rear side support, and the extendable rear cross-support correspond to positions of the respective front supports.

13 Claims, 14 Drawing Sheets

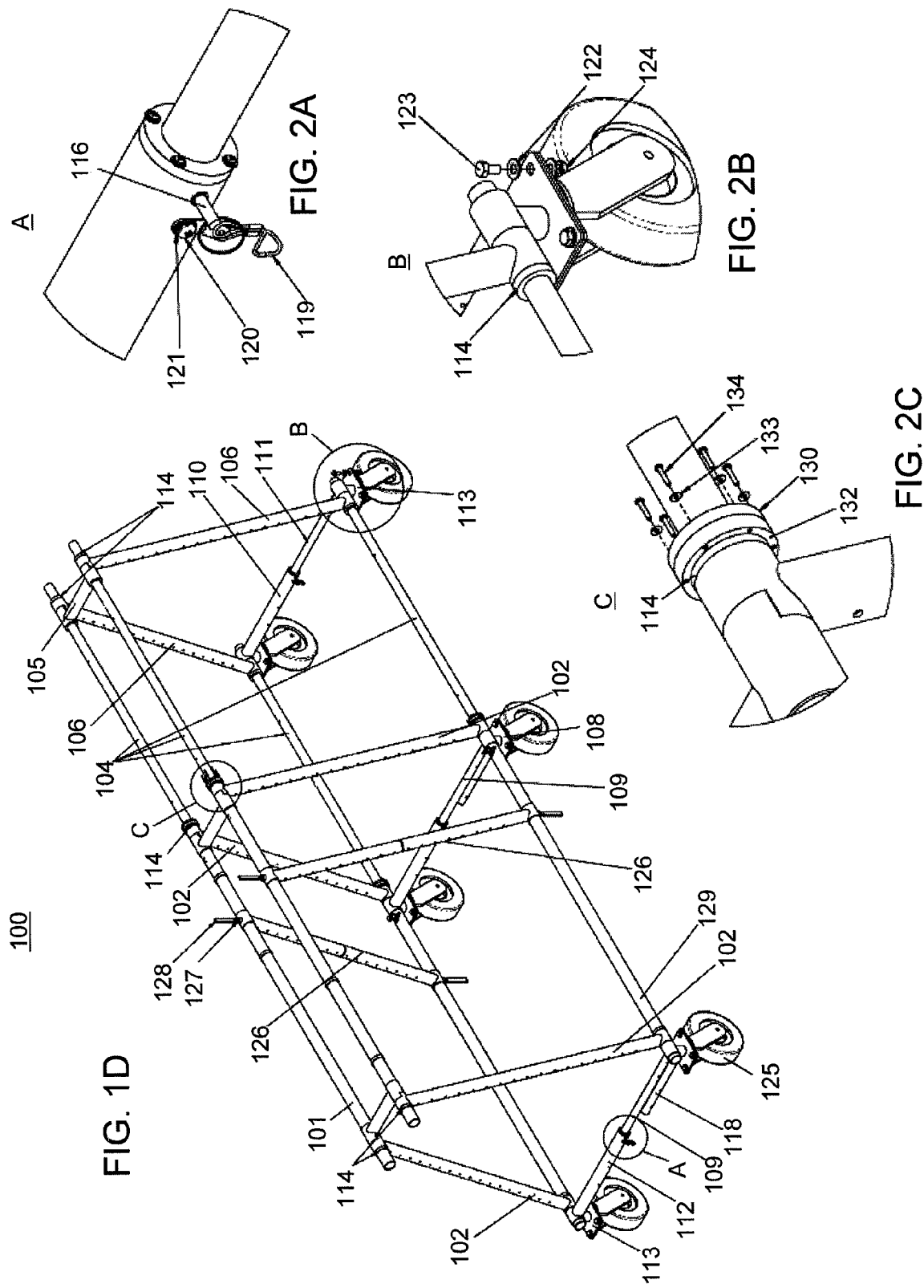

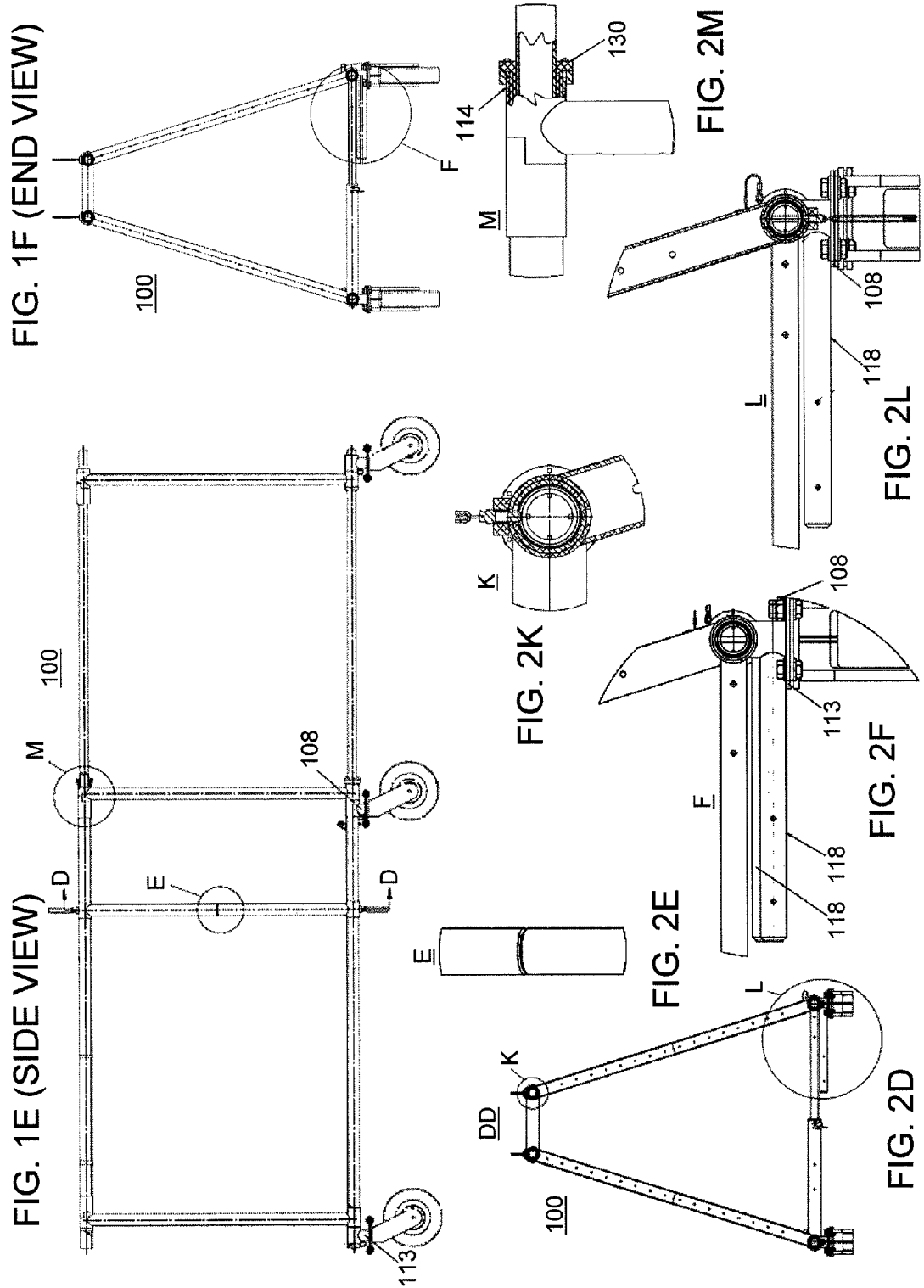

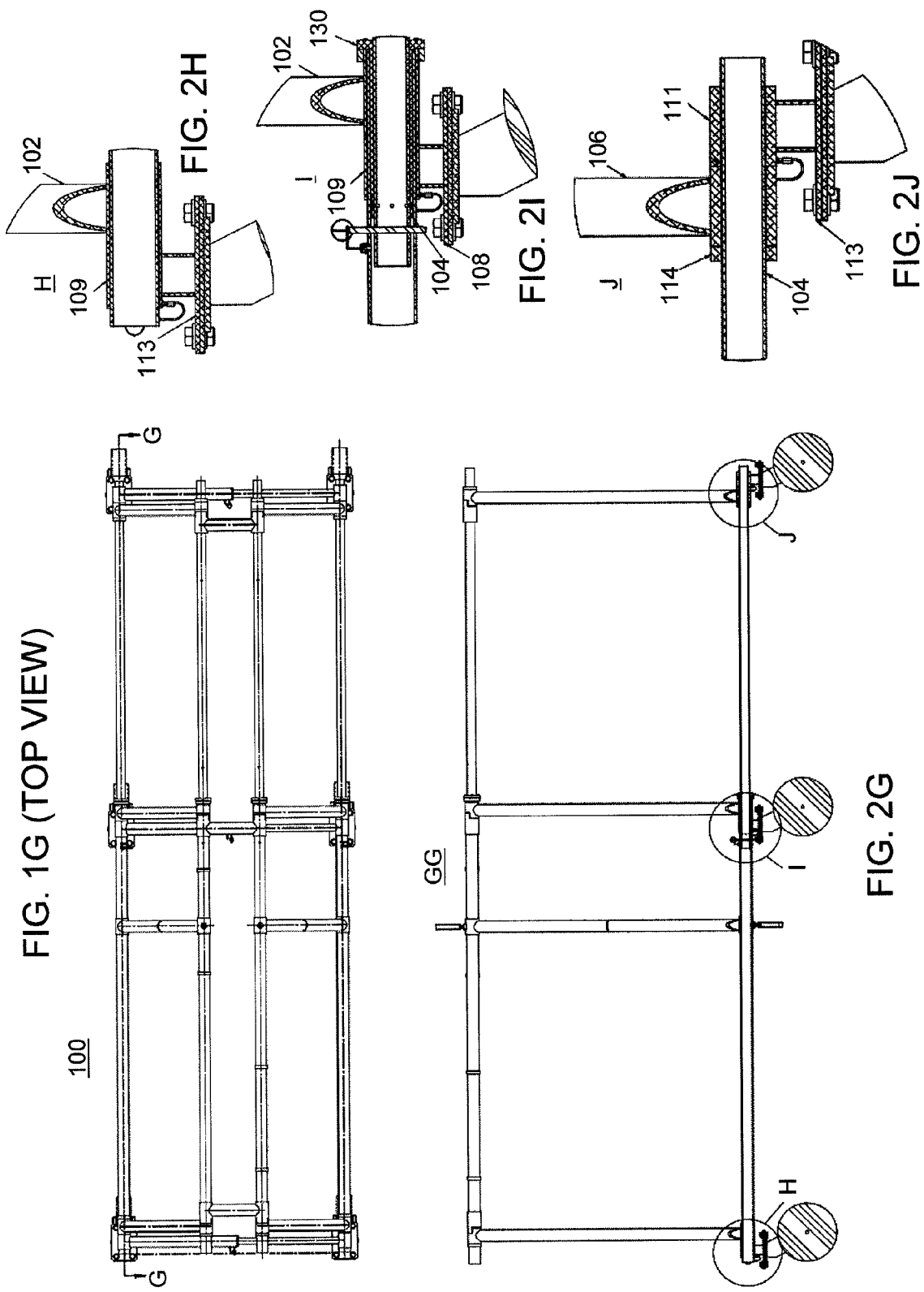

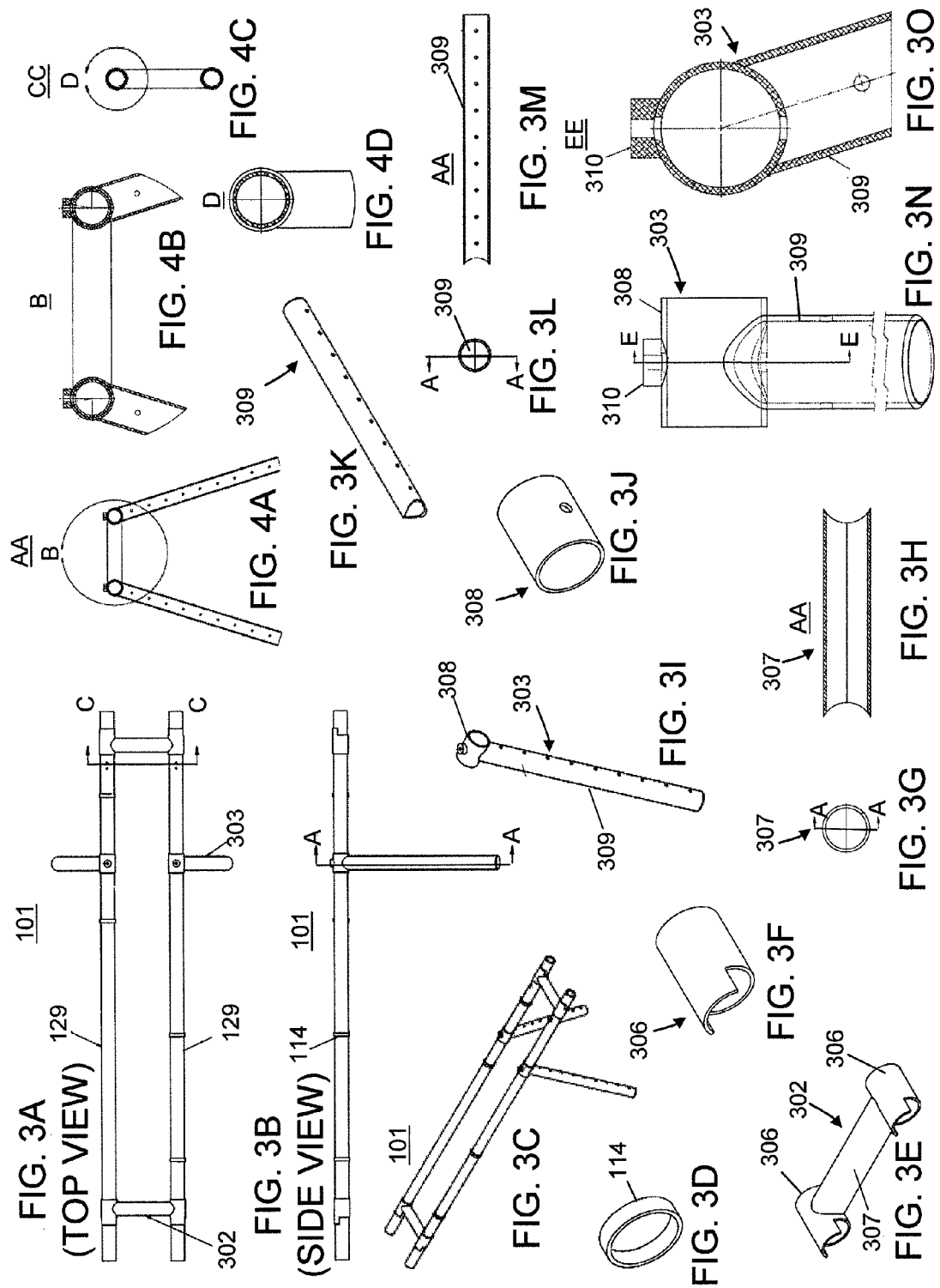

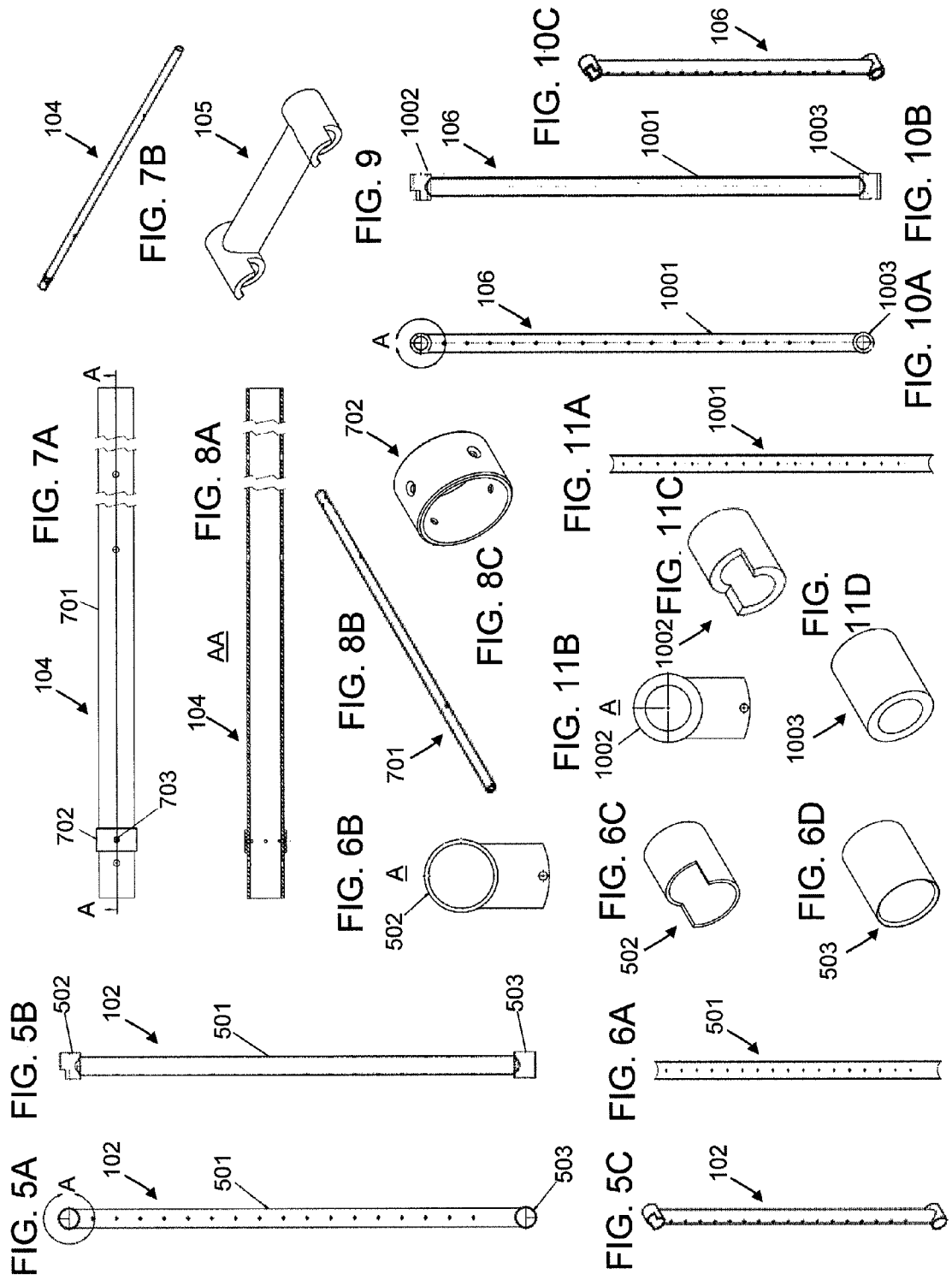

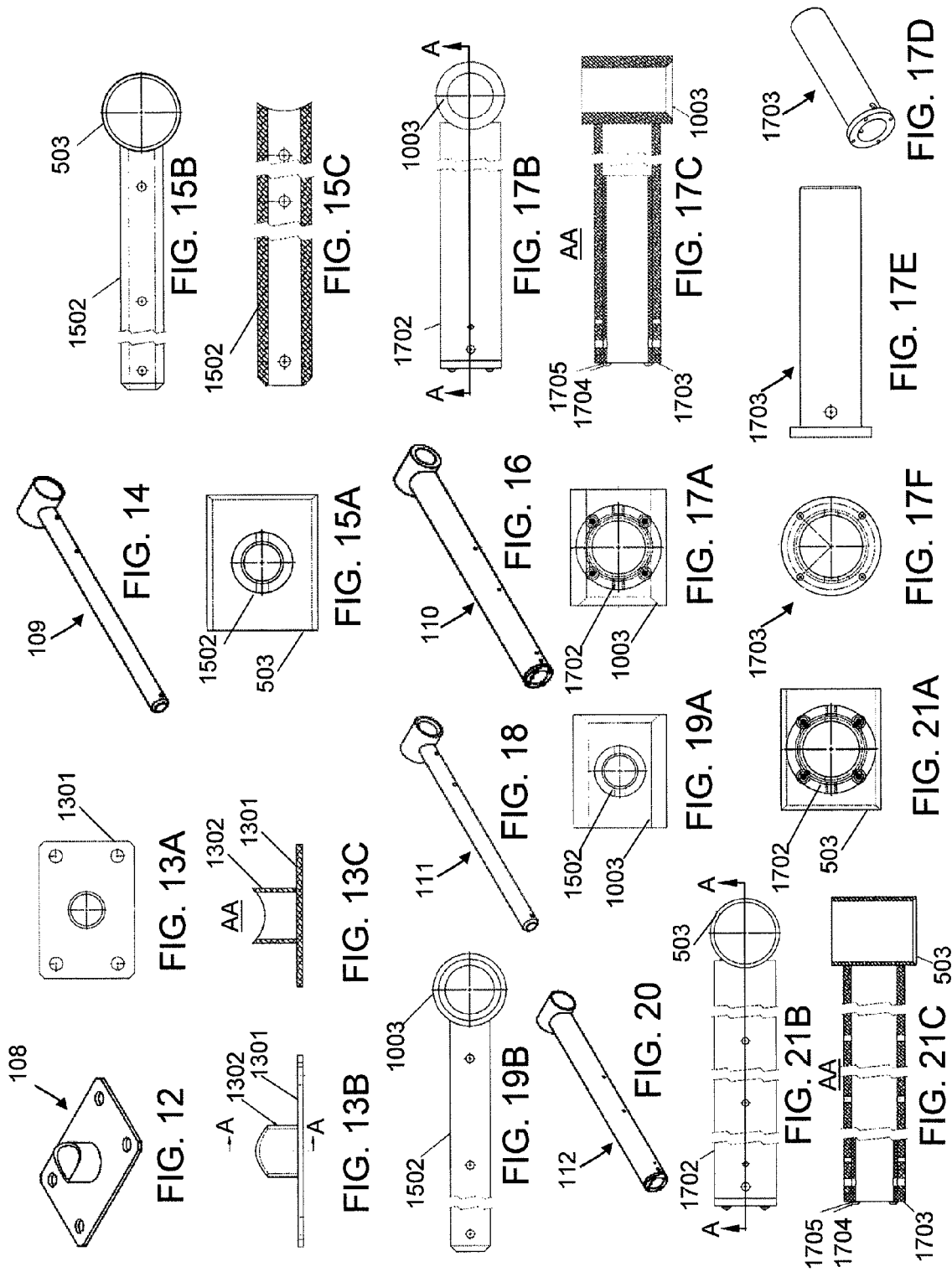

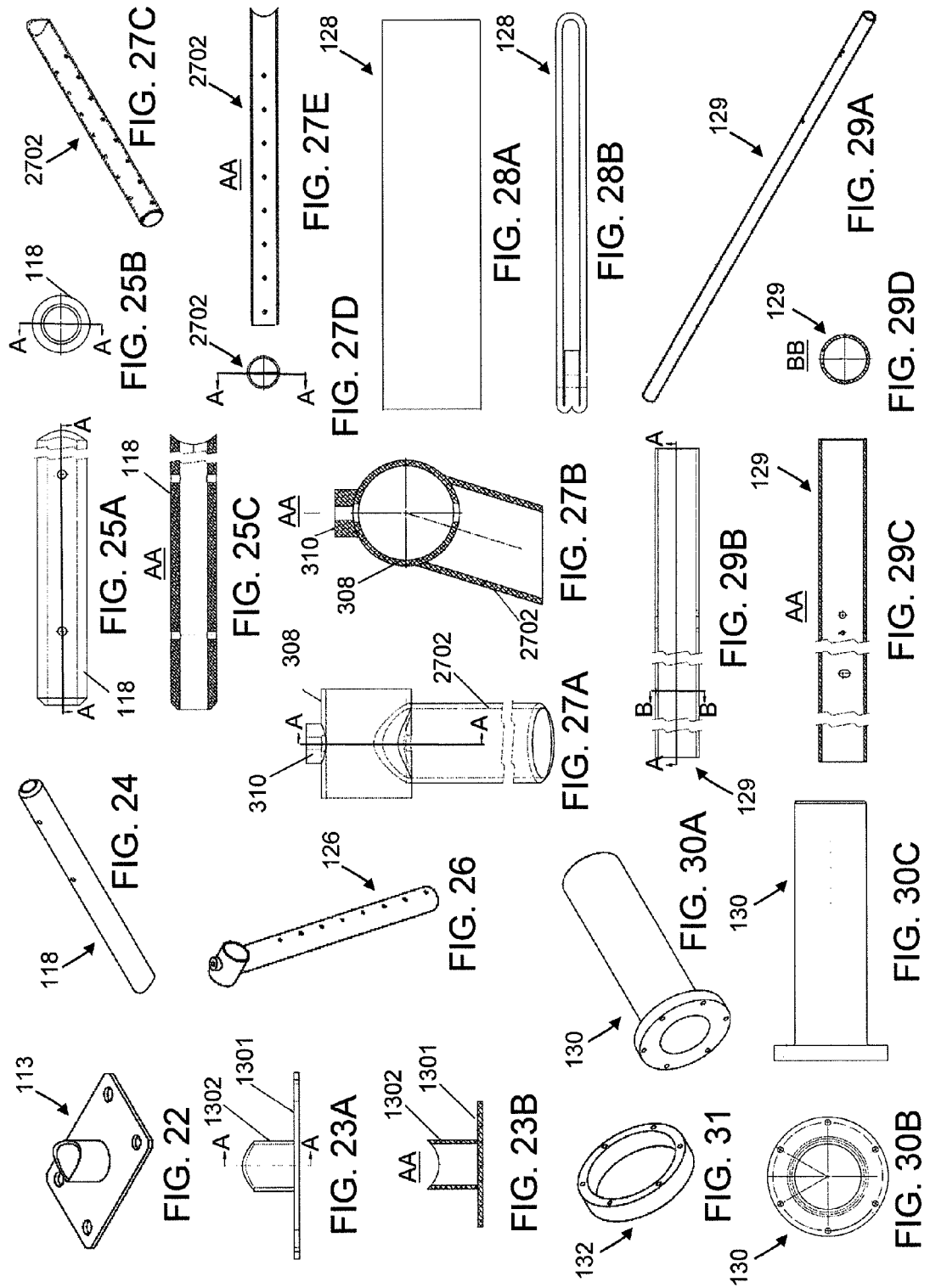

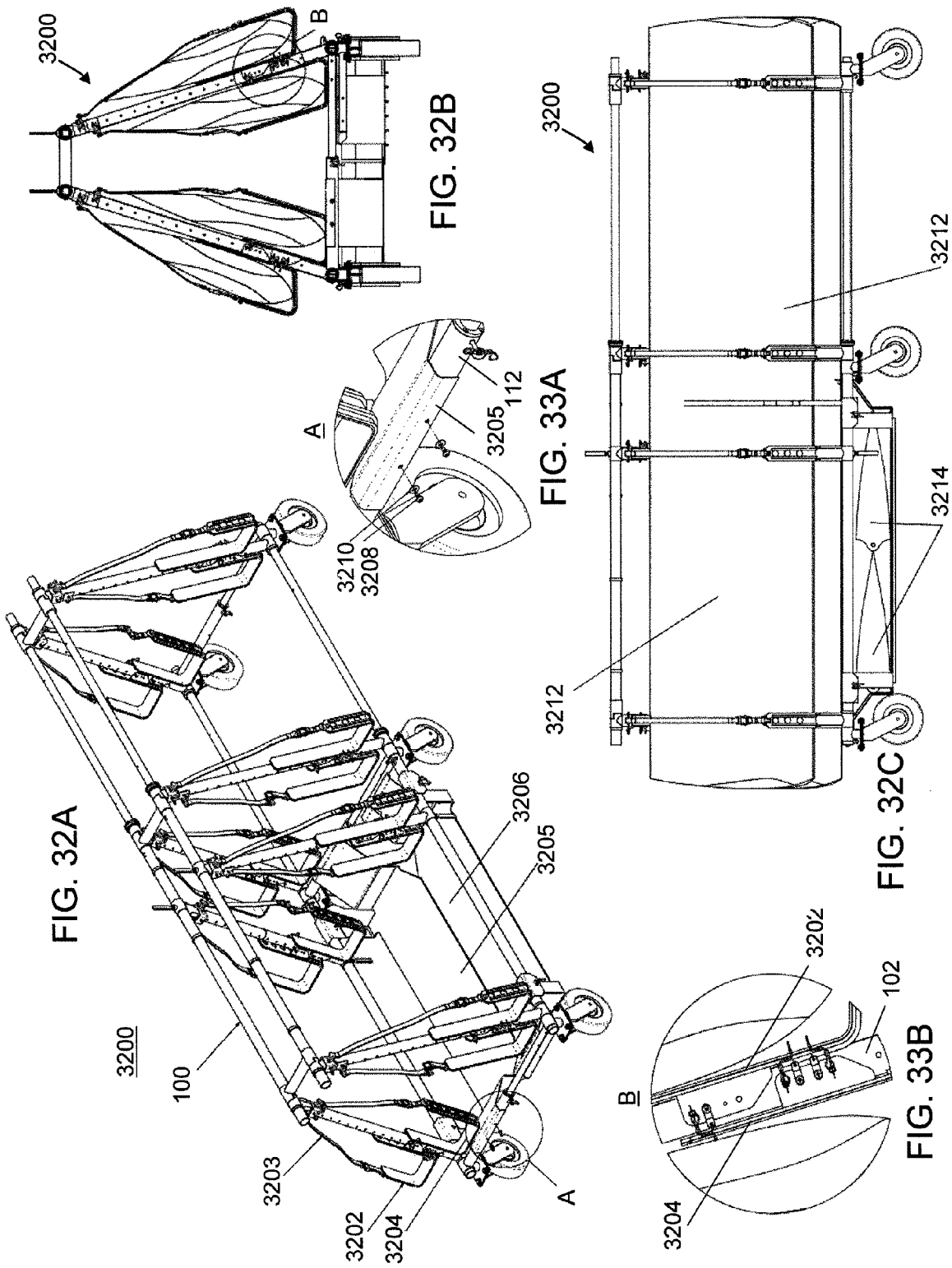

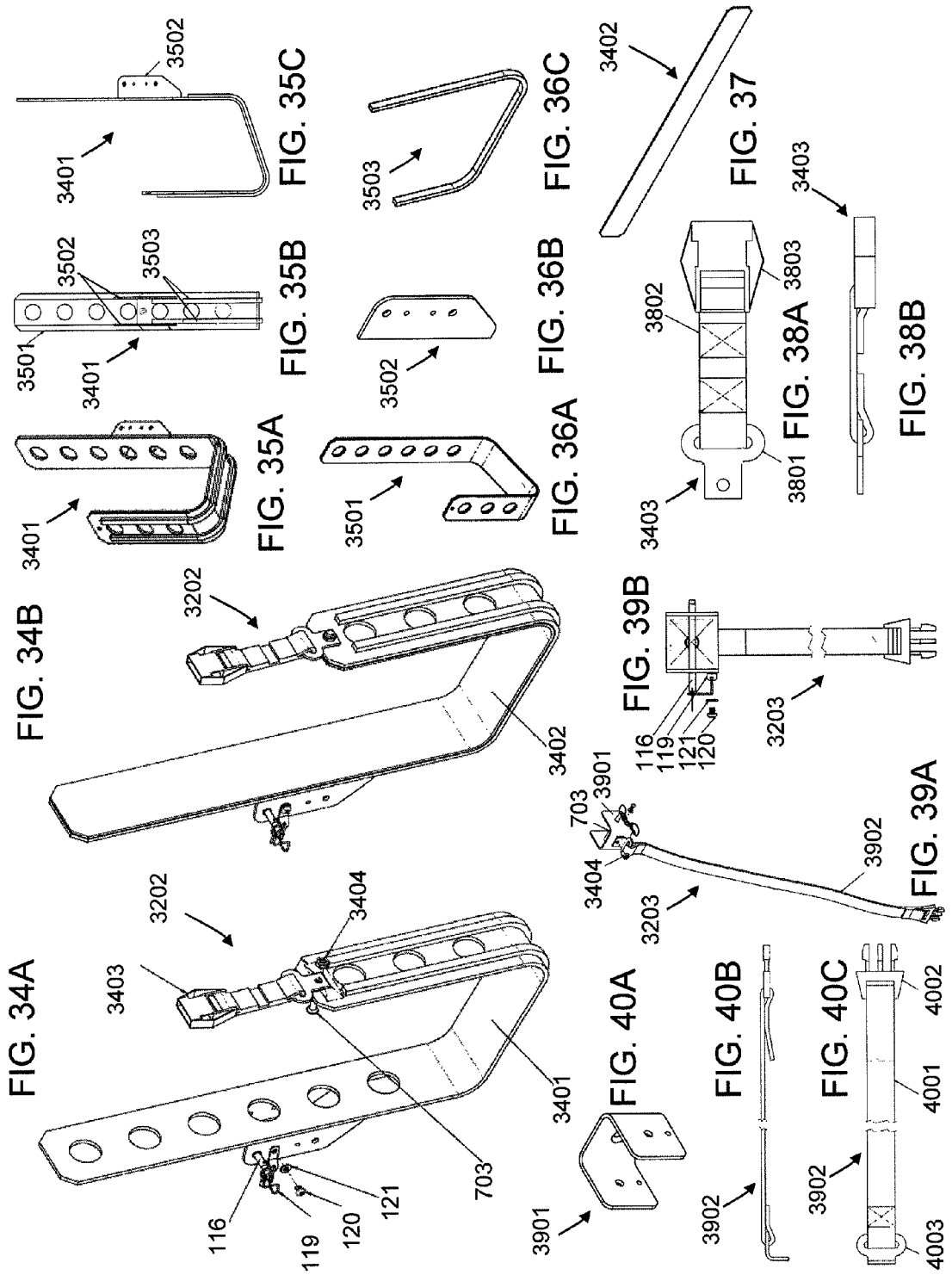

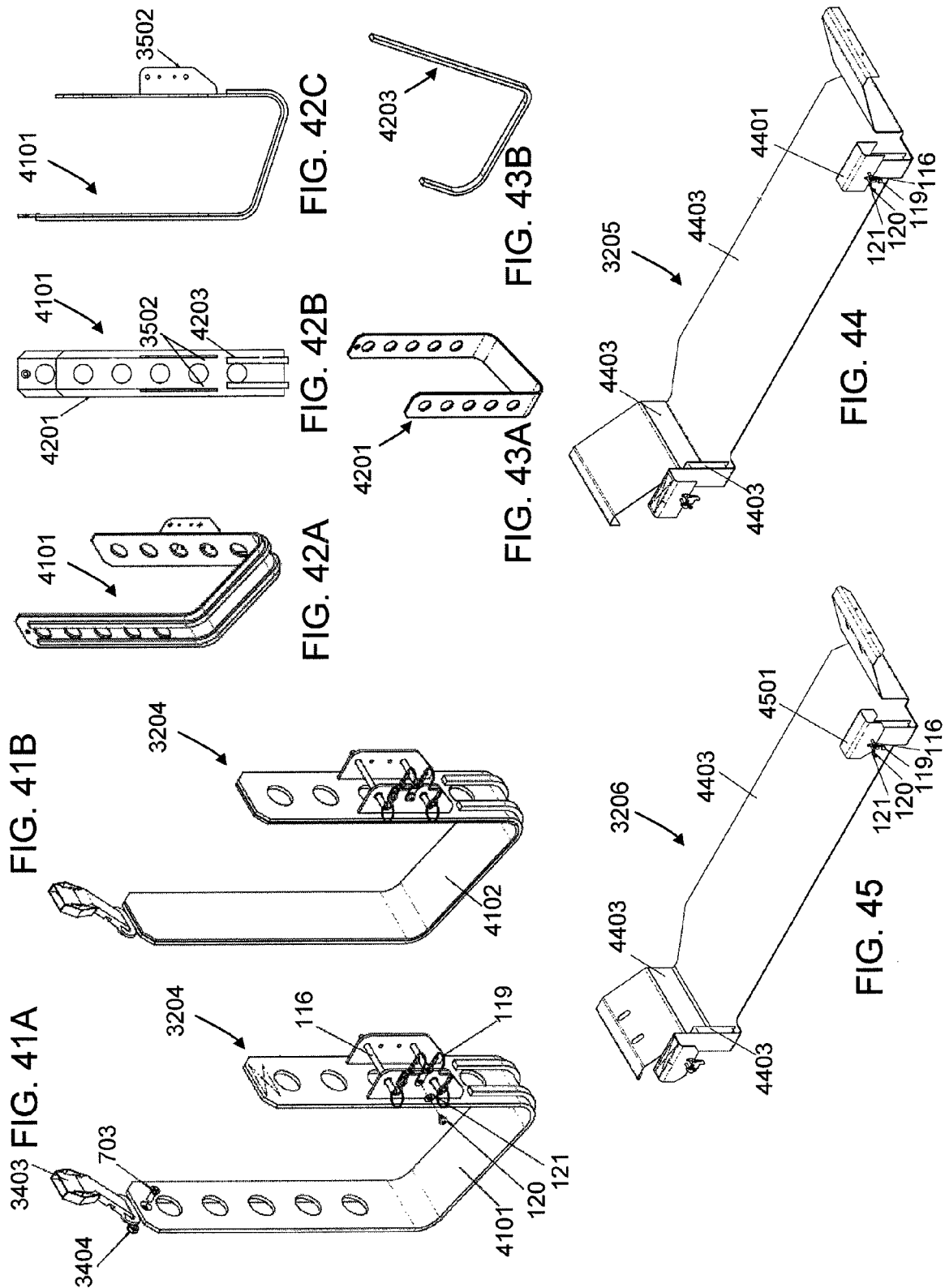

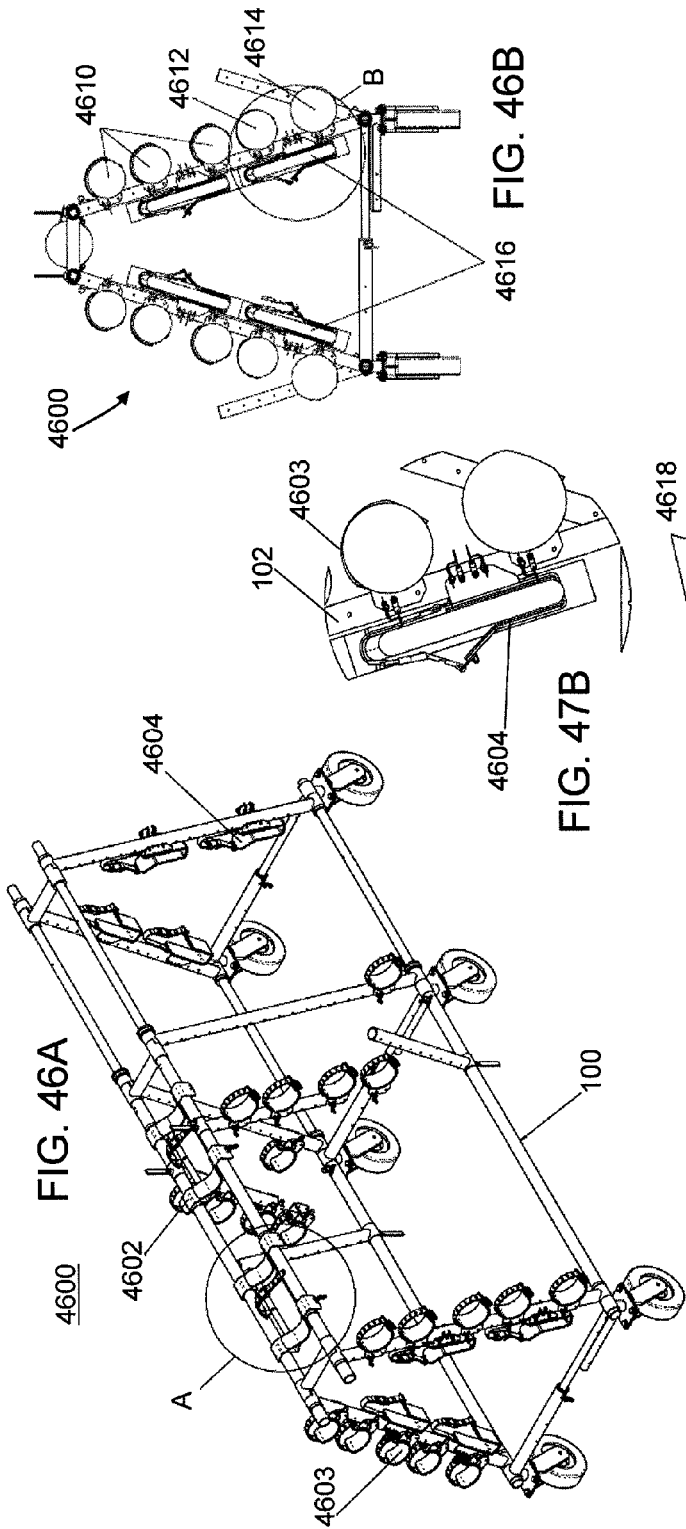

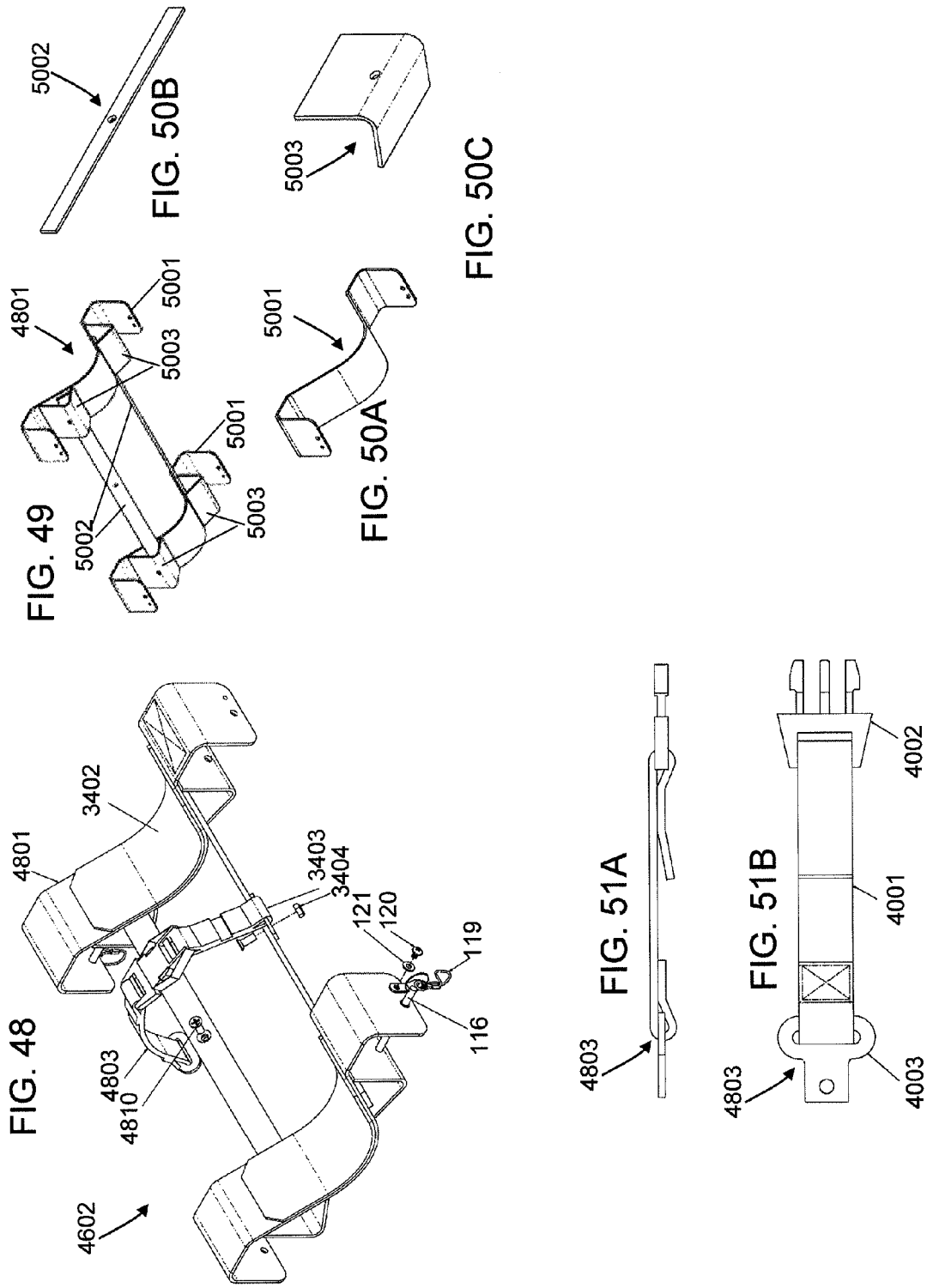

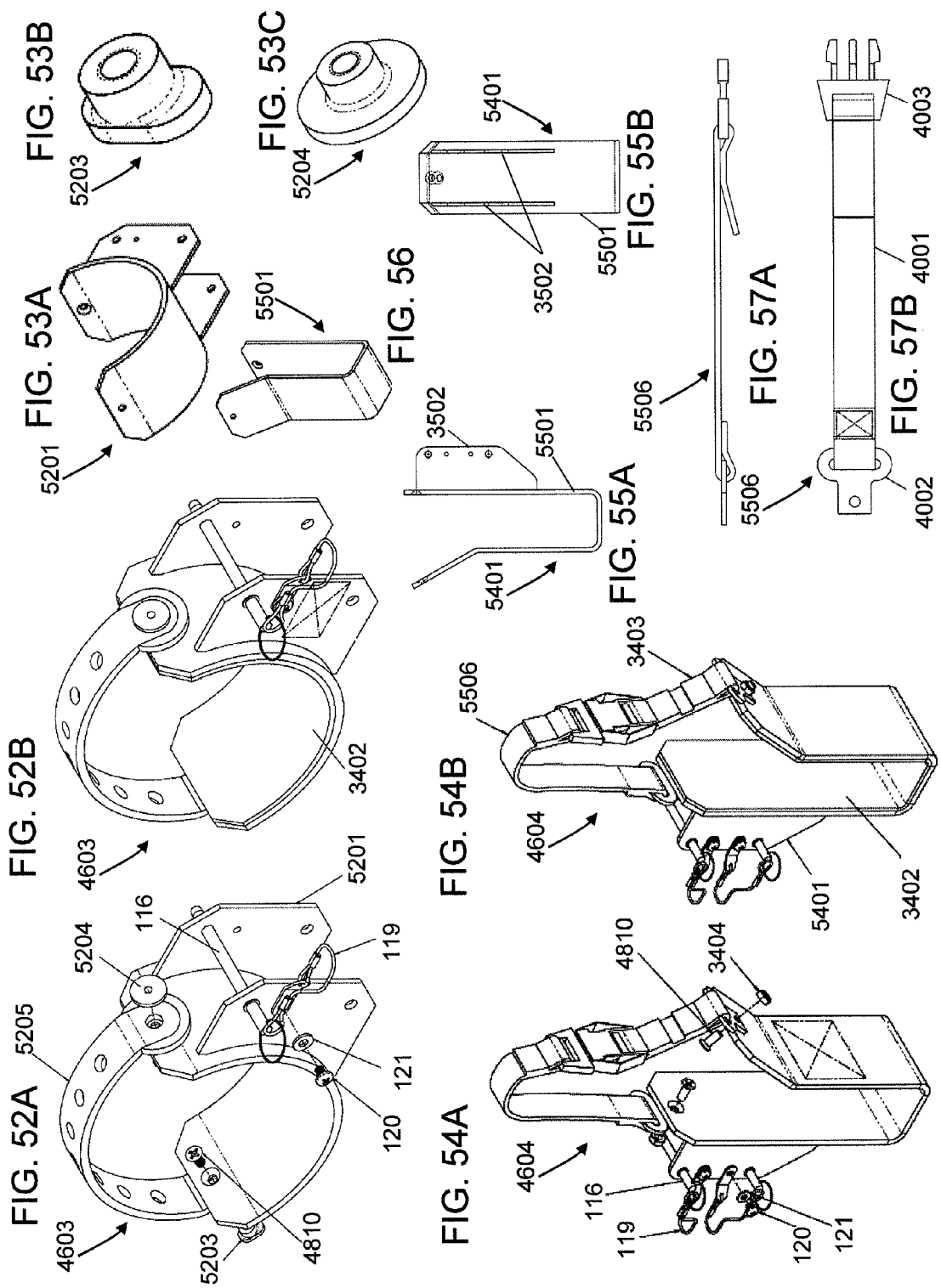

EXTENDABLE AND COLLAPSIBLE APPARATUS THAT SUPPORTS ATTACHABLE COMPONENTS

FIELD

An embodiment of the invention relates generally to a cart for storage and transport of components. More particularly, the invention relates to an A-frame cart that can be extended and collapsed both lengthwise and across its width and that can be configured using interchangeable brackets to accommodate different storage and transport requirements of objects having different shapes and sizes.

BACKGROUND

Carts are a primary device for storing and transporting components or other objects. Since there are all sorts of different components that vary greatly in size and shape, there are also a great variety of carts available having different sizes and configurations intended to meet different component size and shape requirements. Generally, as components become larger and require more specific mounting methods, a cart intended to store and transport the larger components becomes proportionately larger and bulkier, and the cart also tends to be more specialized thereby limiting its use for components other than the components for which it is intended. Such larger carts also have limited maneuverability and take up a larger amount of space in storage areas both during and between uses.

Platform carts, which are sometimes referred to as platform trucks, are widely used due to their ability to store a variety of components. Platform carts come in a variety of sizes and configurations including basic flat platform carts, panel movers, deep retaining wall platform trucks, folding handle platform trucks, bar cradle trucks, bar and pipe trucks, luggage trucks, and the like and are typically 'general purpose' in that they are not designed for specific components although they may have certain features useful for certain types of components. For example, such carts may include uprights to support sheets of paneling or plywood, cradles for holding different sizes of piping, etc. but are not designed for a specific size of paneling or plywood, size of piping, etc. Generally, the components stored and transported in such platform carts merely sit at rest atop the platform and, for certain carts, may lean against an upright or be otherwise constrained by a retaining wall, a cradle, posts, etc. But, such carts typically provide no method for any specialized mounting or capturing of specific components to include sensitive components.

In order to reliably store and transport specific components, custom carts must be designed and manufactured that meet mounting requirements of the specific components. Custom designed carts tend to be costly and their specialized characteristics can result in a large number of custom carts that collectively require a significant amount of storage space.

Therefore, there is a need for an improved cart for storage and transport of components.

SUMMARY

According to one aspect of invention, there is provided a stable extendable apparatus to receive an attachable component. The apparatus includes a top structure, a bottom structure, a front structure and a rear structure. The top structure includes at least one extendable top member which defines a minimum length of the apparatus in a longitudinal retracted position and a maximum length of the apparatus in a longitudinal extended position. The front structure is coupled to the top structure. The front structure includes a first front side support, a second front side support, and an extendable front cross-support to couple the first and second side supports together. The extendable cross-support defines a minimum width of the apparatus in a lateral retracted position and a maximum width of the apparatus in a lateral extended position. Extension or retraction of the extendable front cross-support changes an angle of orientation of the first front side support relative to the second front side support.

The bottom structure is coupled to the front structure and opposed to the top structure. The bottom structure includes at least one extendable bottom member which corresponds in length with the extendable top member. The rear structure is coupled to the top structure and bottom structure. The rear structure includes a first rear side support, a second rear side support, and an extendable rear cross-support to couple the first and second rear side supports together. Extension or retraction of the extendable rear cross-support changes an angle of orientation of the first rear side support relative to the second rear side support. The first rear side support, the second rear side support, and the extendable rear cross-support correspond to positions of the first front side support, second front side support, and extendable front cross-support, respectively.

According to another embodiment of an embodiment of the invention, the apparatus includes a support arm attachable to the top structure and the bottom structure. The support arm may provide secondary support to the apparatus. The support arm may also include a plunger spring system to attach the support arm to the top and bottom structures. The support arm may also define a plurality of mounting holes to receive a respective amount of brackets.

According to further embodiment of an embodiment of the invention, the first front side support, the second front side support, the first rear side support, and the second rear side support define a plurality of mounting holes to receive a respective amount of brackets.

According to another embodiment of an embodiment of the invention, the bottom structure includes at least one moving device to move the apparatus. The moving device may include but is not limited to wheels, tires, or the like.

According to another embodiment of an embodiment of the invention, wherein the extendable front cross-support, extendable rear cross-support, extendable top member, and extendable bottom member each include a first tubing and a second tubing. The first and second tubings are insertable respectively into each other. The first and second tubings may have different cross sections or diameters so that the tubings can slide past each other. Further, the extendable front cross-support, extendable rear cross-support, extendable top member, and extendable bottom member may each further have a locking device to lock and unlock the first tubing to the second tubing. The locking device may be a quick-release pin.

According to another embodiment of an embodiment of the invention, the apparatus includes a stand or a cart, such as an A-Frame cart for storage and transport of components. An embodiment of the invention includes an A-frame cart that provides a strong, lightweight, and adjustable solution to the mounting and restraining of different components having a variety of shapes and sizes, and also accommodates special mounting requirements. The A-frame cart employs a telescopic structural-tubing design that enables the cart to be extended and collapsed both lengthwise and across its width, thereby allowing the cart to be extended to a larger size in order to accommodate larger components while being able to be collapsed to a smaller size to accommodate smaller components and also to reduce its space requirements between uses. The A-frame cart also includes a variable-position vertical support arm that allows the cart to conform to mounting requirements of smaller sized components. The A-frame cart has an interchangeable mounting bracket design that allows for the attachment of generic support brackets as well as specialized brackets designed to meet mounting requirements of specific components. Mounting holes for brackets can be found the entire length of the vertical support bars, allowing for a great number of brackets to be attached concurrently. The cart rests on wheels that enable mobility.

BRIEF DESCRIPTION OF THE DRAWINGS

The subject matter of the application will be more readily understood from the following detailed description when read in conjunction with the accompanying drawings. In the drawings, like reference numbers indicate identical or functionally similar elements. Additionally, the left-most digit(s) of a reference number identifies the drawing in which the reference number first appears.

FIG. 1D depicts the different parts of the exemplary A-frame cart of FIGS. 1A-1C;

FIG. 1E depicts a side view of the exemplary A-frame cart of FIGS. 1A-1C;

FIG. 1F depicts an end view of the exemplary A-frame cart of FIGS. 1A-1C;

FIG. 1G depicts a top view of the exemplary A-frame cart of FIGS. 1A-1C;

FIGS. 2A-2C depict enlarged views of the circled areas A-C of FIG. 1D;

FIG. 2D depicts a cross-sectional view of cross-section DD of FIG. 1E;

FIG. 2E depicts an enlarged view of the circled area E of FIG. 1E;

FIG. 2F depicts an enlarged view of the circled area F of FIG. 1F;

FIG. 2G depicts a cross-sectional view of cross-section GG of FIG. 1G;

FIGS. 2H-2J depict enlarged views of the circled areas H-J of FIG. 2G;

FIGS. 2K-2M depict enlarged views of the circled areas K-M of FIGS. 1E and 2D;

FIGS. 3A-3C depict top, side, and isometric views of an exemplary top frame in accordance with an embodiment of the invention;

FIG. 3D depicts an exemplary rotational stop in accordance with an embodiment of the invention;

FIG. 3E depicts an exemplary cross frame in accordance with an embodiment of the invention;

FIG. 3F depicts and exemplary rear male limiting collar in accordance with an embodiment of the invention;

FIG. 3G depicts an end view of an exemplary front offset support in accordance with an embodiment of the invention;

FIG. 3H depicts a cross-sectional view of cross-section AA of FIG. 3G;

FIG. 3I depicts an exemplary top plunger in accordance with an embodiment of the invention;

FIG. 3J depicts an exemplary rotational collar in accordance with an embodiment of the invention;

FIG. 3K depicts an isometric view of an exemplary top vertical frame support in accordance with an embodiment of the invention;

FIG. 3L depicts an end view of the exemplary vertical frame support top of FIG. 3K;

FIG. 3M depicts a cross-sectional view of cross-section AA of FIG. 3L;

FIG. 3N depicts a side view of the exemplary top plunger of FIG. 3I;

FIG. 3O depicts a cross-sectional view of cross-section EE of FIG. 3N;

FIG. 4A depicts a cross-sectional view of cross-section AA of FIG. 3B;

FIG. 4B depicts an enlarged view of the circled area B of FIG. 4A;

FIG. 4C depicts a cross-sectional view of cross-section CC of FIG. 3A;

FIG. 4D depicts an enlarged view of the circled area D of FIG. 4C;

FIGS. 5A, 5B, and 5C depicts different side views and an isometric view of an exemplary side support in accordance with an embodiment of the invention;

FIG. 6A depicts an exemplary frame side support in accordance with an embodiment of the invention;

FIG. 6B depicts an enlarged view of the circled area A of FIG. 5A;

FIG. 6C depicts an exemplary front male limiting collar in accordance with an embodiment of the invention;

FIG. 6D depicts an exemplary rotational collar in accordance with an embodiment of the invention;

FIGS. 7A and 7B depict side and isometric views of an exemplary an extendable top or bottom member in accordance with an embodiment of the invention;

FIG. 8A depicts a cross-sectional view of cross-section AA of FIG. 7A;

FIG. 8B depicts an exemplary rear frame tubing in accordance with an embodiment of the invention;

FIG. 8C depicts an exemplary rear tube stopper in accordance with an embodiment of the invention;

FIG. 9 depicts an exemplary rear cross frame in accordance with an embodiment of the invention;

FIGS. 10A, 10B, and 10C depict different side views and an isometric view of an exemplary rear side support in accordance with an embodiment of the invention;

FIG. 11A depicts an exemplary frame side support in accordance with an embodiment of the invention;

FIG. 11B depicts an enlarged view of the circled area A of FIG. 10A;

FIG. 11C depicts an exemplary rear female limiting collar in accordance with an embodiment of the invention;

FIG. 11D depicts an exemplary rear side support collar in accordance with an embodiment of the invention;

FIG. 12 depicts an isometric view of an exemplary middle wheel mount in accordance with an embodiment of the invention;

FIG. 13A depicts an exemplary wheel mounting plate in accordance with an embodiment of the invention;

FIG. 13B depicts a side view of the exemplary middle wheel mount of FIG. 12;

FIG. 13C depicts a cross-sectional view of cross-section AA of FIG. 13B;

FIG. 14 depicts an exemplary front support in accordance with an embodiment of the invention;

FIG. 15A depicts an end view of the exemplary front support of FIG. 14;

FIG. 15B depicts a side view of the exemplary front support of FIG. 14;

FIG. 15C depicts an exemplary male cross support in accordance with an embodiment of the invention;

FIG. 16 depicts an exemplary rear cross support in accordance with an embodiment of the invention;

FIG. 17A depicts an end view of the exemplary rear cross support of FIG. 16;

FIG. 17B depicts a side view of the exemplary rear cross support of FIG. 16;

FIG. 17C depicts a cross-sectional view of cross-section AA of FIG. 17B;

FIG. 17D depicts an isometric view of an exemplary folding sleeve insert in accordance with an embodiment of the invention;

FIG. 17E depicts a side view of the exemplary folding sleeve insert of FIG. 17D;

FIG. 17F depicts an end view of the exemplary folding sleeve insert of FIG. 17D;

FIG. 18 depicts another exemplary rear cross support in accordance with an embodiment of the invention;

FIG. 19A depicts an end view of the exemplary rear cross support of FIG. 18;

FIG. 19B depicts a side view of the exemplary rear cross support of FIG. 18;

FIG. 20 depicts another exemplary front support in accordance with an embodiment of the invention;

FIG. 21A depicts a side view of the exemplary front support of FIG. 20;

FIG. 21B depicts another side view of the exemplary front support of FIG. 20;

FIG. 21C depicts a cross-sectional view of cross-section AA of FIG. 21B;

FIG. 22 depicts an isometric view of an exemplary outer wheel mount in accordance with an embodiment of the invention;

FIG. 23A depicts a side view of the exemplary outer wheel mount of FIG. 22;

FIG. 23B depicts a cross-sectional view of cross-section AA of FIG. 23A;

FIG. 24 depicts an isometric view of an exemplary shelf post in accordance with an embodiment of the invention;

FIG. 25A depicts a side view of the exemplary shelf post of FIG. 24;

FIG. 25B depicts an end view of the exemplary shelf post of FIG. 24;

FIG. 25C depicts a cross-sectional view of cross-sections AA of FIGS. 25A and 25B;

FIG. 26 depicts an isometric view of an exemplary bottom plunger in accordance with an embodiment of the invention;

FIG. 27A depicts a side view of the exemplary bottom plunger of FIG. 26;

FIG. 27B depicts a cross-sectional view of cross-section AA of FIG. 27A;

FIG. 27C depicts an isometric view of an exemplary bottom vertical frame support in accordance with an embodiment of the invention;

FIG. 27D depicts a side view of the exemplary bottom vertical frame support of FIG. 27C;

FIG. 27E depicts a cross-sectional view of cross-section AA of FIG. 27D;

FIG. 28A depicts a top view of an exemplary strap in accordance with an embodiment of the invention;

FIG. 28B depicts a side view of the exemplary strap of FIG. 28A;

FIG. 29A depicts an isometric view of an exemplary bottom frame tubing in accordance with an embodiment of the invention;

FIG. 29B depicts a side view of the exemplary bottom frame tubing of FIG. 29A;

FIG. 29C depicts a cross-sectional view of cross-section AA of FIG. 29B;

FIG. 29D depicts a cross-sectional view of cross-section BB of FIG. 29B;

FIG. 30A depicts an isometric view of an exemplary collapsing sleeve insert in accordance with an embodiment of the invention;

FIGS. 30B and 30C depict end and side views of the exemplary collapsing sleeve insert of FIG. 30A, respectively;

FIG. 31 depicts an isometric view of an exemplary mating collar in accordance with an embodiment of the invention;

FIG. 32A-32C depict isometric, end, and side views of an exemplary stabilator configured cart assembly in accordance with a second embodiment of an embodiment of the invention;

FIGS. 33A and 33B depict enlarged views of the circled areas A and B of FIGS. 32A and 32B;

FIGS. 34A and 34B depict isometric views of an exemplary exterior bracket assembly in accordance with an embodiment of the invention;

FIGS. 35A-C depict isometric, end, and side views of an exemplary exterior bracket in accordance with an embodiment of the invention;

FIG. 36A depicts an isometric view of an exemplary exterior stabilator mounting bracket in accordance with an embodiment of the invention;

FIG. 36B depicts an isometric view of an exemplary exterior mounting gusset in accordance with an embodiment of the invention;

FIG. 36C depicts an isometric view of an exemplary exterior mounting rib in accordance with an embodiment of the invention;

FIG. 37 depicts an isometric view of an exemplary mount rubber insert in accordance with an embodiment of the invention;

FIGS. 38A and 38B depict top and side views of an exemplary base strap assembly in accordance with an embodiment of the invention;

FIGS. 39A and 39B depict isometric and side views of an exemplary upper strap assembly in accordance with an embodiment of the invention;

FIG. 40A depicts an isometric view of an exemplary upper strap mount in accordance with an embodiment of the invention;

FIGS. 40B and 40C depict side and top views of an exemplary upper stabilator strap assembly in accordance with an embodiment of the invention;

FIGS. 41A and 41B depict isometric views of an exemplary interior bracket assembly in accordance with an embodiment of the invention;

FIGS. 42A-C depict isometric, end, and side views of an exemplary interior bracket in accordance with an embodiment of the invention;

FIG. 43A depicts an isometric view of an exemplary interior stabilator mounting bracket in accordance with an embodiment of the invention;

FIG. 43B depicts an isometric view of an exemplary interior mounting rib in accordance with an embodiment of the invention;

FIG. 44 depicts an isometric view of an exemplary base shelving assembly in accordance with an embodiment of the invention;

FIG. 45 depicts an isometric view of an exemplary secondary base shelving assembly in accordance with an embodiment of the invention;

FIG. 46A-46C depict isometric, end, and side views of an exemplary drive shaft and tail rotor configured cart assembly in accordance with a third embodiment of an embodiment of the invention;

FIGS. 47A and 47B depict enlarged views of the circled areas A and B of FIGS. 46A and 46B;

FIG. 48 depicts an isometric view of an exemplary top drive shaft mount assembly in accordance with an embodiment of the invention;

FIG. 49 depicts an isometric view of an exemplary top drive shaft mount in accordance with an embodiment of the invention;

FIG. 50A depicts an isometric view of an exemplary top drive mounting plate in accordance with an embodiment of the invention;

FIG. 50B depicts an isometric view of an exemplary support plate in accordance with an embodiment of the invention;

FIG. 50C depicts an isometric view of an exemplary top support brace in accordance with an embodiment of the invention;

FIGS. 51A and 51B depict side and top views of an exemplary upper drive shaft strap assembly in accordance with an embodiment of the invention;

FIGS. 52A and 52B depict isometric views of an exemplary exterior shaft bracket assembly in accordance with an embodiment of the invention;

FIG. 53A depicts an isometric view of an exemplary exterior shaft bracket in accordance with an embodiment of the invention;

FIG. 53B depicts an isometric view of an exemplary strap tab in accordance with an embodiment of the invention;

FIG. 53C depicts an isometric view of an exemplary strap retainer in accordance with an embodiment of the invention;

FIGS. 54A and 54B depict isometric views of an exemplary interior tail rotor assembly in accordance with an embodiment of the invention;

FIGS. 55A and 55B depict an isometric and an end view of an exemplary interior tail rotor bracket assembly in accordance with an embodiment of the invention;

FIG. 56 depicts an isometric view of an exemplary interior tail rotor bracket in accordance with an embodiment of the invention; and FIGS. 57A and 57B depict side and top views of an exemplary tail rotor strap assembly in accordance with an embodiment of the invention.

DETAILED DESCRIPTION

Figure 1A:
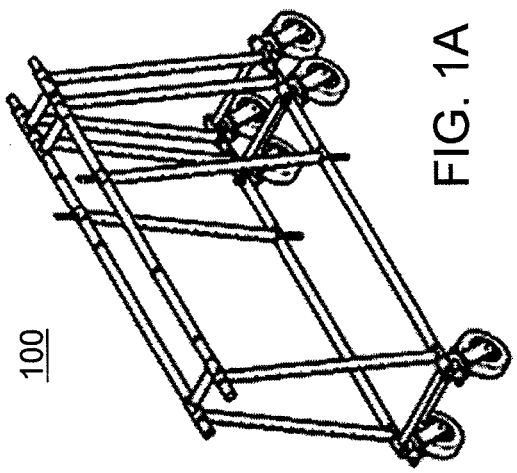
FIG. 1A depicts an exemplary A-frame cart having been collapsed in both width and length in accordance with a first embodiment of the invention.

An embodiment of the invention will now be described more fully in detail with reference to the accompanying drawings are shown. This invention should not, however, be construed as limited to the embodiments set forth herein; rather, they are provided so that this disclosure will be thorough and complete and will fully convey the scope of embodiments of the invention to those skilled in the art. Like numbers refer to like elements throughout.

An embodiment of the invention provides stable extendable apparatus to store and transport components. An example of such apparatus may include but is not limited to a cart, a stand, or the like. In one embodiment, the apparatus is an A-frame cart as depicted in the accompanying figures. The A-frame cart comprises telescopic structural-tubing that enables the cart to be extended and collapsed both lengthwise and across its width. The A-frame cart may include one or more variable-position vertical support arms that allow the cart to conform to mounting requirements of small components. The A-frame cart allows for the attachment of generic support brackets as well as specialized brackets designed to meet mounting requirements of specific components. Mounting holes for brackets can be found the entire length of the vertical support bars, allowing for a great number of brackets to be attached concurrently.

The cart rests on a movable device that enables mobility. An example of such movable device are wheel mechanisms. In another embodiment, the wheels comprise large run-flat caster-style tires, allowing the cart to operate on both finished and rough surfaces such as terrain. The wheels or tires may include locking mechanisms that can be locked to make the cart immobile or unlocked to allow the cart to move.

The cart may be converted into a stand. For example, the A-frame cart can also be converted to an immobile yet collapsible A-frame stand by replacing the tires with feet, legs, or other standing devices intended to enable the stand to remain in a fixed position. All the wheels or tires can be replaced with a standing device or the stand can also be configured such that a portion of the stand is fixed in place on a standing device while the extendable and collapsible portions have wheels allowing the stand to be extended and collapsed more easily. For example, an outer wheel mount 113 and an inner wheel mount 108 on one side of the stand could be replaced with legs that are fixed to a surface (e.g., bolted to a floor), where the remaining wheels could be used to extend and collapse the width and length of the stand. Additionally, if additional support is needed the portion of the rear and front cross supports 110, 112 could be configured with tubing that would be parallel to the bottom frame tubing 129 and extendable member 104, which could also be used to support additional wheels that would be approximately half way between the back and front wheels when the cart 100 was extended in width fully.

FIG. 1A depicts an exemplary A-frame cart 100 having been collapsed in both width and length in accordance with a first embodiment of the invention. When the A-frame cart 100 has been collapsed in both width and length, the space it requires is minimized and it is easier to maneuver.

Figure 1C:
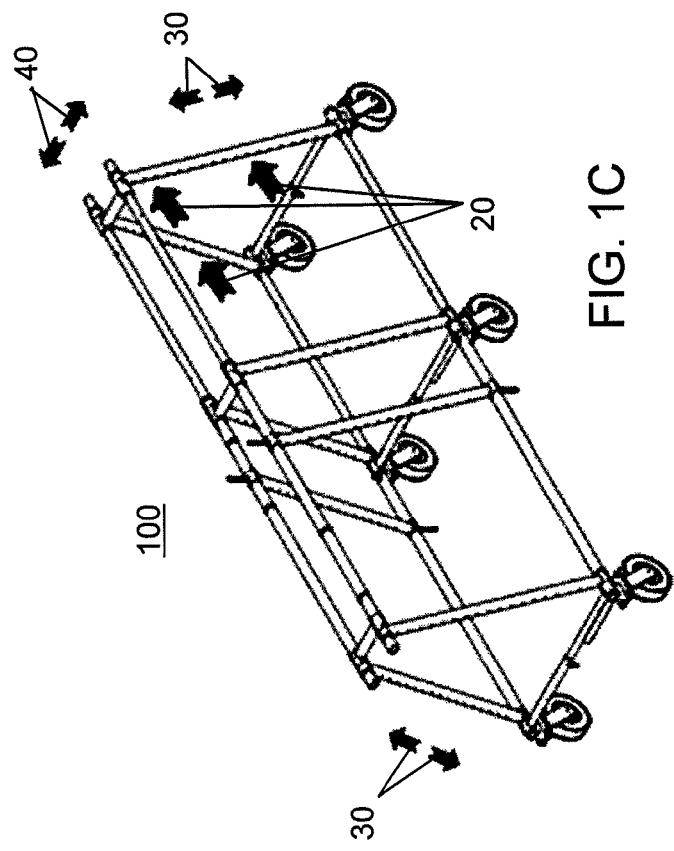
FIG. 1C depicts the exemplary A-frame cart of FIG. 1A having been extended in width and in length
Figure 1B:
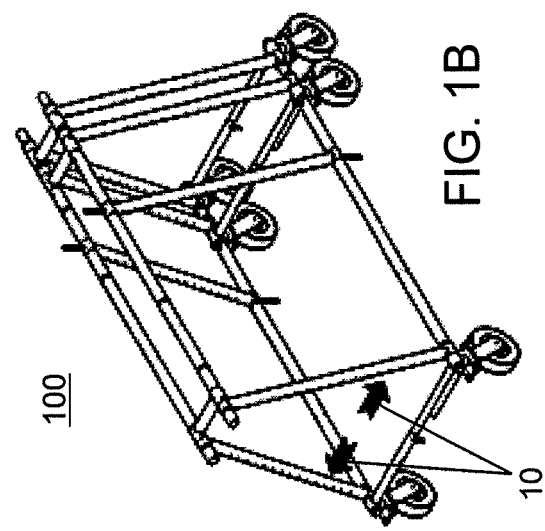
FIG. 1B depicts the exemplary A-frame cart of FIG. 1A having been extended in width.

FIG. 1B depicts the exemplary A-frame cart 100 of FIG. 1A having been extended in width as indicated by the two lateral arrows 10. By extending the width of the A-frame cart, additional stability is achieved making it less likely to tip over onto its side.

FIG. 1C depicts the exemplary A-frame cart 100 of FIG. 1A having been extended in width and in length as indicated by the three longitudinal arrows 20. By extending the length of the A-fame cart, larger components can be stored and transported, additional components can be stored and transported, or some combination thereof. Although the A-frame cart 100 as described herein is not able to extend or collapse its side supports or its top structure or frame (as indicated by side arrows 30 and by top arrows 40), one skilled in the art will recognize that the telescopic structural-tubing approach described herein could also be applied to the side supports of the A-frame cart and/or to its top frame. Moreover, the cart 100 could be configured to use a single tubing instead of a top frame comprising two tubings and a cross frame. The tubing could also be a table or platform like structure. Additionally, the top frame could have additional tubings such that instead of two parallel tubings there are three or more parallel tubings.

FIG. 1D depicts the different parts of the exemplary A-frame cart 100 of FIGS. 1A-1C. Referring to FIG. 1D, A-frame cart 100 comprises a top structure or frame 101, four side supports (a first front side support 102, a second front side support 102, a first rear side support 106, and a second rear side support 106), at least one extendable top member and one opposing extendable bottom member 104, a rear cross frame 105, two middle wheel mounts 108, at least a first and second front support 109 and 112, a first rear cross support 110, a second rear cross support 111, four outer wheel mounts 113, twelve rotational stops 114, two shelf posts 118, six wheels 125, two bottom plungers 126, four locking spring plungers 127, four straps 128, two bottom frame tubings 129, and four collapsible sleeve inserts 130. The two bottom plungers 126 are part of two moveable side support arms that can be positioned as desired on the two bottom frame tubings 129 and frame tubing of the top structure 101 in order to accommodate components of different lengths.

The two moveable side support arms do not have to be across from each other (as shown). Additional moveable side support arms can also be used and the use of such support is entirely optional. Moreover, one skilled in the art would recognize that similar supports could be used in conjunction with the at least one extendable top member and bottom member 104. Alternatively, fixed or moveable side supports could be configured horizontally such that they attached to the vertically oriented side support 102. Generally, all sorts of combinations are possible for use of fixed and moveable side supports. Similarly, different combinations of cross supports extending across the bottom frame tubings 129, the bottom member 104, the top member 104, and/or the top structure are possible.

The telescopic structural tubing of the cart 100 of FIGS. 1A-1C is designed where a first tubing having an outer diameter fits within a second tubing having a inner diameter sized so that the first tubing will fit within the second tubing. One skilled in the art will recognize that the telescopic structural tubing of the cart 100 could include three or more such tubing sized to fit together to provide additional telescopic capabilities. In alternate embodiments, different cross-sectional shapes of the tubing may be used including circular tubing, rectangular tubing, and the like. The telescopic structural tubing of the cart 100 of FIGS. 1A-1C could alternatively be designed such that instead of the cart having one portion that collapses into the second portion from one side, the cart could have one portion that collapses into the second portion from one side and a third portion that collapses into the second portion from the other side. As such, the cart 100 would have eight wheels instead of six.

Also depicted in FIG. 1D are three circled areas A-C, which are shown in enlarged views in FIGS. 2A-2C. An extendable front cross-support comprises the first front support 109 and the second front support 112 to couple the side supports 102. Similarly, an extendable rear cross-support opposed to the front cross-support includes a first rear cross support 110 and a second rear cross support 111. As can be seen in FIG. 1D, the at least one extendable top member and one opposing extendable bottom member 104 are sized such they can slide within the top and bottom structures to enable the A-frame cart 100 to be extended or collapsed along its length. Similarly, the two first front supports 109 are sized to slide within the two second front supports 112 and the second rear cross support 111 is sized to slide within the first rear cross support 110 thereby enabling the A-frame cart 100 to be extended or collapsed along its width.

FIG. 1E depicts a side view of the exemplary A-frame cart 100 of FIGS. 1A-1C. Shown are side views of the middle wheel mount 108 and the outer wheel mount 113. Also shown is a cross section DD, and circled areas E and M, which are further depicted in FIGS. 2D, 2E and 2M, respectively.

FIG. 1F depicts an end view of the exemplary A-frame cart 100 of FIGS. 1A-1C. Shown is a circled area F for which an enlarged view is provided in FIG. 2F.

FIG. 1G depicts a top view of the exemplary A-frame cart 100 of FIGS. 1A-1C. Shown is a cross section GG, which is also depicted in FIG. 2G.

FIGS. 2A-2C depict enlarged views of the circled areas A-C of FIG. 1D. Referring to FIG. 2A, a quick-release pin 116 is shown partially inserted into a hole in the side of the second front support 112. A loop-tab/lanyard/wire rope assembly 119 is depicted attached to the quick-release pin 116. In alternate embodiments, other locking mechanisms may be used in place of the quick-release pin 116. A pan head machine screw 120 and a flat washer 121 attaching one end of the wire rope of the loop-tab/lanyard/wire rope assembly 119 to the second front support 112 thereby allowing the quick-release pin 116 to hang loose when not inserted into the second front support 112.

Referring to FIG. 2B, a an extendable bottom member 104 is shown inserted into a rotational stop 114. The wheel 125 is fixed onto outer wheel mount 113, for example using a hex head cap screw 123, a flat washer 122, and a locknut 124 to bolt the wheel 125. Other fixing mechanisms may be contemplated.

Referring to FIG. 2C, a collapsing sleeve insert 130 is shown inserted into a rotational stop 114 and is also shown being attached to a mating collar 132 using flat washers 133 and pan head machine screws 134.

FIG. 2D depicts a cross-sectional view of cross-section DD of FIG. 1E. Shown are circled areas K and L for which enlarged views are provided in FIGS. 2K and 2L, respectively.

FIG. 2E depicts an enlarged view of the circled area E of FIG. 1E, whereby a part of the top structure 101 that is extending downward is shown abutting a bottom plunger 126.

FIG. 2F depicts an enlarged view of the circled area F of FIG. 1F, where an outer wheel mount 113 is shown in front of and substantially in line with a middle wheel mount 108. Also shown are two shelf posts 118 beneath the two front supports 109, where the top portion of a shelf post 118 that is behind the nearest shelf post 118 can be seen as viewed from a point slightly above the nearest shelf post 118.

FIG. 2G depicts a cross-sectional view of cross-section GG of FIG. 1G. Shown are circled areas H, I, and J for which enlarged views are provided in FIGS. 2H-2J, respectively.

FIGS. 2H-2J depict enlarged views of the circled areas H-J of FIG. 2G, which correspond to where the wheels 125 are mounted to one side of the cart 100. Referring to FIG. 2H, a side support 102 intersects with the bottom frame tubing near a front support 109 just above and to the right of outer wheel mount 113. Referring to FIG. 2I, a side support 102 intersects with the bottom frame tubing near a front support 109 just above and to the right of the middle wheel mount 108. The extendable member 104 can be seen inside a collapsing sleeve insert 130. Referring to FIG. 2J, a rear side support 106 intersects with the extendable member 104 near a rear cross support 111 just above and to the left of the outer wheel mount 113. A rotational stop 114, which is intended to restrain movement, is also shown about extendable member 104.

FIGS. 2K-2M depict enlarged views of the circled areas K-M of FIGS. 1E and 2D. Referring to FIG. 2K, the enlarged view of circled area K shows the intersection of a top portion of a moveable side support with the tubing of the top structure 101. A portion of a cross frame of the top structure 101 can be seen behind the intersection of the side support and tubing. Referring to FIG. 2L, the enlarged view of circled area L shows the intersection of a bottom portion of a moveable side support with the bottom frame tubing 129. A portion of a shelve post 118 and a portion of the middle wheel mount 108 can be seen behind the intersection of the side support and tubing. Referring to FIG. 2M, the enlarged view of circled area M shows a side support attached to top frame such that it can rotate next to a rotational stop 114 that restricts movement. Also shown is a portion of a collapsing sleeve insert 130.

FIGS. 3A-3C depict top, side, and isometric views of an exemplary top structure 101 in accordance with an embodiment of the invention. Top structure 101 comprises two bottom frame tubing 129, two cross frames 302, and two top plungers 303, which correspond to the top portions of moveable side supports previously described. A cross section AA is shown in FIG. 3B, which is further depicted in FIG. 4A. A cross-section CC is shown in FIG. 3A, which is further depicted in FIG. 4C. Also shown in FIGS. 3A-3C are several rotational stops 114 that can be positioned as desired to restrain movement of objects associated with the bottom frame tubing. For example, in FIG. 47A, rotational stops are used to restrain movement of top drive shaft mounts.

FIG. 3D depicts an exemplary rotational stop in accordance with an embodiment of the invention. Various sizes of rotational stops having different inside inner and outer diameters are used with an embodiment of the invention to accommodate different sized tubing. Generally, rotational stops are used alongside rotating collars and the like that rotate about the tubing making up the framing of the cart, etc. The rotational stops allow rotation necessary to collapse or extend the width of the cart 100 but restrain the collars from sliding down the tubing. Rotational stops can also be used to restrain movement of other objects attached to the tubing such as the top drive shaft mounts of FIG. 47A.

FIG. 3E depicts an exemplary cross frame 302 in accordance with an embodiment of the invention, which comprises two rear male limiting collars 306 which reside on each end of a front offset support 307.

FIG. 3F depicts and exemplary rear male limiting collar 306 in accordance with an embodiment of the invention. The notch portion of the collar 306 allows a range of movement when used with a side support 102, where the range of movement corresponds to the rotation of the side support relative to the tubing when the width of the cart is extended or collapsed.

FIG. 3G depicts an end view of an exemplary front offset support in accordance with an embodiment of the invention. Seen in FIG. 3G is a cross-section AA, which is shown in FIG. 3H.

FIG. 3H depicts a cross-sectional view of cross-section AA of FIG. 3G.

FIG. 3I depicts an exemplary top plunger 303 in accordance with an embodiment of the invention, which comprises a rotational collar 308 and a top vertical frame support 309. The top plunger 303 is configured to combine with bottom plunger 126 to provide a moveable side support.

FIG. 3J depicts an exemplary rotational collar 308 in accordance with an embodiment of the invention, which includes a hole for a threaded boss 310 shown in FIGS. 3I, 3N and 3O.

FIG. 3K depicts an isometric view of an exemplary top vertical frame support 309 in accordance with an embodiment of the invention an embodiment of the invention. The top vertical frame support has mounting holes down its length that allow for quick-release pins to be used to support various types of attachments (e.g., brackets, straps, etc.).

FIG. 3L depicts an end view of the exemplary top vertical frame support 309 of FIG. 3K. Seen in FIG. 3L is a cross-section AA, which is shown in FIG. 3M.

FIG. 3M depicts a cross-sectional view of cross-section AA of FIG. 3L.

FIG. 3N depicts a side view of the exemplary top plunger 303 of FIG. 3I, which comprises rotational collar 308, top vertical frame support 309, and threaded boss 310. Seen in FIG. 3N is a cross-section EE, which is shown in FIG. 3O.

FIG. 3O depicts a cross-sectional view of cross-section EE of FIG. 3N.

FIG. 4A depicts a cross-sectional view of cross-section AA of FIG. 3B. Shown is circular region B which is enlarged in FIG. 4B.

FIG. 4B depicts an enlarged view of the circled area B of FIG. 4A. As shown, the two top plungers 303 are able to rotate around bottom frame tubing 129. A portion of a cross frame 302 can be seen behind the two top plungers 303.

FIG. 4C depicts a cross-sectional view of cross-section CC of FIG. 3A. Seen in FIG. 4C is a circled area D, which is enlarged in FIG. 4D.

FIG. 4D depicts an enlarged view of the circled area D of FIG. 4C, which shows the bottom frame tubing 129 within a rear male limiting collar 306.

FIGS. 5A, 5B, and 5C depict different side views and an isometric view of an exemplary side support 501 in accordance with an embodiment of the invention an embodiment of the invention. The side support 501 comprises a frame side support 501, a front female limiting collar, 502, and a rotational collar 503. Shown in FIG. 5A is a circled area A that is enlarged in FIG. 6B. Although the side support 501 is shown having a fixed length it could instead be configured using multiple tubing having different sizes to enable telescopic behavior.

FIG. 6A depicts an exemplary frame side support 501 in accordance with an embodiment of the invention. The side support 501 has mounting holes down its length that enable quick release pins to attach objects to the side support such as brackets and the like.

FIG. 6B depicts an enlarged view of the circled area A of FIG. 5A.

FIG. 6C depicts an exemplary front female limiting collar 502 in accordance with an embodiment of the invention. The notch portion of the collar 502 allows a range of movement when used with a cross frame 302, where the range of movement corresponds to the rotation of the side support relative to the tubing when the width of the cart is extended or collapsed.

FIG. 6D depicts an exemplary rotational collar 503 in accordance with an embodiment of the invention. The rotational collar 503 of FIG. 6D is very similar to the rotational collar 308 of FIG. 3J except it does not include a hole for a threaded boss.

FIGS. 7A and 7B depict side and isometric views of an exemplary an extendable top or bottom member 104 in accordance with an embodiment of the invention, which comprises a rear frame tubing 701, a rear tube stopper 702, and a flat head machine screw 703. Seen in FIG. 7A is a cross-section AA, which is shown in FIG. 8A.

FIG. 8A depicts a cross-sectional view of cross-section AA of FIG. 7A.

FIG. 8B depicts an exemplary rear frame tubing 701 in accordance with an embodiment of the invention.

FIG. 8C depicts an exemplary rear tube stopper 702 in accordance with an embodiment of the invention.

FIG. 9 depicts an exemplary rear cross frame 105, in accordance with an embodiment of the invention, which is similar to the cross frame 302 except its male limiting collars have smaller inside diameters to accommodate the smaller outer diameter of the extendable member 104.

FIGS. 10A, 10B, and 10C depict different side views and an isometric view of an exemplary rear side support 106 in accordance with an embodiment of the invention, which comprises a frame side support 1001, rear female limiting collar 1002, and rear side support collar 1003. FIG. 10A includes a circled area A that is enlarged in FIG. 11B.

FIG. 11A depicts an exemplary frame side support 1001 in accordance with an embodiment of the invention.

FIG. 11B depicts an enlarged view of the circled area A of FIG. 10A.

FIG. 11C depicts an exemplary rear female limiting collar 1002 in accordance with an embodiment of the invention. The rear female limiting collar 1002 of FIG. 11C is similar to the rear female limiting collar 502 of FIG. 6C except it has a smaller inside diameter or cross-section intended to accommodate the smaller outer diameter or cross-section of extendable member 104. The notch portion of the collar 1002 allows a range of movement when used with a rear cross frame 105, where the range of movement corresponds to the rotation of the rear side support relative to the tubing when the width of the cart is extended or collapsed.

FIG. 11D depicts an exemplary rear side support collar 1003 in accordance with an embodiment of the invention. The rear side support collar 1003 of FIG. 11D is similar to the rear side support collar 503 of FIG. 6D except it has a smaller inside diameter intended to accommodate the smaller outer diameter of extendable member 104.

FIG. 12 depicts an isometric view of an exemplary middle wheel mount 108 in accordance with an embodiment of the invention, which comprises a wheel mounting plate and wheel mount tubing.

FIG. 13A depicts an exemplary wheel mounting plate 1301 in accordance with an embodiment of the invention.

FIG. 13B depicts a side view of the exemplary middle wheel mount 108 of FIG. 12. Shown in FIG. 31B is a cross-section AA, which is depicted in FIG. 13C.

FIG. 13C depicts a cross-sectional view of cross-section AA of FIG. 13B.

FIG. 14 depicts an exemplary front support 109 in accordance with an embodiment of the invention.

FIG. 15A depicts an end view of the exemplary front support 109 of FIG. 14, where a male cross support 1502 is attached to a rotational collar 503 having an inside diameter sized to rotate about the bottom frame tubing. The outside diameter of the male cross support 1502 is sized to fit inside a female cross support 1702.

FIG. 15B depicts a side view of the exemplary front support of FIG. 14.

FIG. 15C depicts an exemplary male cross support 1502 in accordance with an embodiment of the invention.

FIG. 16 depicts an exemplary rear cross support 110 in accordance with an embodiment of the invention.

FIG. 17A depicts an end view of the exemplary rear cross support 110 of FIG. 16, where a female cross support 1702 is attached to a rotational collar 1003 having an inside diameter sized to rotate about the extendable member 104. The inside diameter of the female cross support 1702 is sized to accept a male cross support 1502.

FIG. 17B depicts a side view of the exemplary rear cross support of FIG. 16. Seen in FIG. 17B is a cross-section AA, which is depicted in FIG. 17C. The inside diameter of the rear side support collar 1003 is sized to rotate about the extendable member 104.

FIG. 17C depicts a cross-sectional view of cross-section AA of FIG. 17B, which shows a folding sleeve insert 1703, a pan head machine screw 1704, and a flat washer 1705.

FIG. 17D depicts an isometric view of an exemplary folding sleeve insert 1703 in accordance with an embodiment of the invention.

FIG. 17E depicts a side view of the exemplary folding sleeve insert 1703 of FIG. 17D.

FIG. 17F depicts an end view of the exemplary folding sleeve insert 1703 of FIG. 17D.

FIG. 18 depicts another exemplary rear cross support 111 in accordance with an embodiment of the invention.

FIG. 19A depicts an end view of the exemplary rear cross support 111 of FIG. 18, where a male cross support 1502 is attached to a rotational collar 1003 having an inside diameter sized to rotate about the extendable member 104. The diameter of the male cross support 1502 is sized to allow it to fit within female cross support 1702.

FIG. 19B depicts a side view of the exemplary rear cross support 111 of FIG. 18.

FIG. 20 depicts another exemplary second front support 112 in accordance with an embodiment of the invention.

FIG. 21A depicts an end view of the exemplary second front support 112 of FIG. 20, where a female cross support 1702 is attached to a rotational collar 503 having an inside diameter sized to rotate about the bottom frame tubing 129. The diameter of the female cross support 1702 is sized to accept a male cross support 1502.

FIG. 21B depicts a side view of the exemplary second front support 112 of FIG. 20. Seen in FIG. 21B is a cross-section AA, which is depicted in FIG. 21C.

FIG. 21C depicts a cross-sectional view of cross-section AA of FIG. 21B, which shows a folding sleeve insert 1703, a pan head machine screw 1704, and a flat washer 1705.

FIG. 22 depicts an isometric view of an exemplary outer wheel mount in accordance with an embodiment of the invention, which comprises a wheel mounting plate 1301 and wheel mount tubing 1302.

FIG. 23A depicts a side view of the exemplary outer wheel mount of FIG. 22. Seen in FIG. 23A is a cross-section AA, which is depicted in FIG. 23B.

FIG. 23B depicts a cross-sectional view of cross-section AA of FIG. 23A.

FIG. 24 depicts an isometric view of an exemplary shelf post 118 in accordance with an embodiment of the invention.

FIG. 25A depicts a side view of the exemplary shelf post 118 of FIG. 24. Seen in FIG. 25A is a cross-section AA, which is depicted in FIG. 25C.

FIG. 25B depicts an end view of the exemplary shelf post 118 of FIG. 24. Seen in FIG. 25B is a cross-section AA, which is depicted in FIG. 25C.

FIG. 25C depicts a cross-sectional view of cross-sections AA of FIGS. 25A and 25B.

FIG. 26 depicts an isometric view of an exemplary bottom plunger 126 in accordance with an embodiment of the invention.

FIG. 27A depicts a side view of the exemplary bottom plunger 126 of FIG. 26, which comprises a rotational collar 308, a threaded boss 310, and a bottom vertical frame support 2702. Seen in FIG. 27A is a cross-section AA, which is depicted in FIG. 27B.

FIG. 27B depicts a cross-sectional view of cross-section AA of FIG. 27A.

FIG. 27C depicts an isometric view of an exemplary bottom vertical frame support 2702 in accordance with an embodiment of the invention. The bottom vertical frame support 2702 has mounting holes down its length for use with brackets and the like.

FIG. 27D depicts an end view of the exemplary bottom vertical frame support 2702 of FIG. 27C. Seen in FIG. 27D is a cross-section AA, which is depicted in FIG. 27E.

FIG. 27E depicts a cross-sectional view of cross-section AA of FIG. 27D.

FIG. 28A depicts a top view of an exemplary strap 128 in accordance with an embodiment of the invention.

FIG. 28B depicts a side view of the exemplary strap 128 of FIG. 28A.

FIG. 29A depicts an isometric view of an exemplary bottom frame tubing 129 in accordance with an embodiment of the invention;

FIG. 29B depicts a side view of the exemplary bottom frame tubing 129 of FIG. 29A. Seen in FIG. 29B are cross-sections AA and BB, which are depicted in FIG. 29C and FIG. 29D, respectively.

FIG. 29C depicts a cross-sectional view of cross-section AA of FIG. 29B.

FIG. 29D depicts a cross-sectional view of cross-section BB of FIG. 29B.

FIG. 30A depicts an isometric view of an exemplary collapsing sleeve insert 130 in accordance with an embodiment of the invention.

FIGS. 30B and 30C depict end and side views of the exemplary collapsing sleeve insert 130 of FIG. 30A, respectively.

FIG. 31 depicts an isometric view of an exemplary mating collar 132 in accordance with an embodiment of the invention. Mating collar 132 is attached, or mated with collapsing sleeve insert 130 as depicted in FIG. 2C.

The A-frame cart 100 of the invention can be configured using interchangeable brackets to accommodate different storage and transport requirements of objects having different shapes and sizes. Described below are two examples of how such interchangeable brackets can be used for transporting aircraft stabilator, drive shaft, tail rotor, etc. Specifically, descriptions of an exemplary cart assembly configured for transporting stabilator and of an exemplary cart assembly configured for transporting drive shaft and tail rotor are provided. One skilled in the art will recognize that in accordance with an embodiment of the invention the A-frame cart 100 can be configured in numerous other ways as appropriate to accommodate many different objects of different sizes and shapes.

FIG. 32A-32C depict isometric, end, and side views of an exemplary stabilator configured cart assembly 3200 in accordance with a second embodiment of an embodiment of the invention. Referring to FIG. 32A, the stabilator configured cart assembly 3200 comprises an A-frame cart 100, eight exterior bracket assemblies 3202, sixteen upper strap assemblies 3203, eight inner bracket assemblies 3204, a base shelf assembly 3205, and a secondary base shelf assembly 3206. Seen in FIG. 32A is circled area A, which is depicted in FIG. 33A. Seen in FIG. 32B is circled area B, which is depicted in FIG. 33B. Side views of stabilator components 3212 and 3214 are provided in FIG. 32C.

FIGS. 33A and 33B depict enlarged views of the circled areas A and B of FIGS. 32A and 32B, respectively. Referring to FIG. 33A, pan head machine screws 3208 and flat washers 3210 are shown being used to attach the base shelf assembly 3205 to the second front support 112. Referring to FIG. 33B, exterior and interior bracket assemblies 3202, 3204 are attached to a side support 102 using quick release pins 116 that are attached to lanyard/wire rope/loop tab assemblies 119 using pan head machine screws 120 and flat washers 121 in a manner like that shown in FIG. 2A.

FIGS. 34A and 34B depict isometric views of an exemplary exterior bracket assembly 3202 in accordance with an embodiment of the invention. Referring to FIGS. 34A and 34B, exterior bracket assembly 3202 comprises an exterior bracket 3401, a rubber insert 3402, a base strap assembly 3403, a nylon-insert locknut 3404, and a flat head machine screw 703. The assembly is attached to a side support 102 using a quick release pin 116 that is attached to lanyard/wire rope/loop tab assembly 119 using a pan head machine screw 120 and a flat washer 121.

FIGS. 35A-C depict isometric, end, and side views of an exemplary exterior bracket 3401 in accordance with an embodiment of the invention. The exterior bracket 3401 comprises an exterior stabilator mounting bracket 3501, two mounting gussets 3502, and two exterior mounting ribs.

FIG. 36A depicts an isometric view of an exemplary exterior stabilator mounting bracket 3501 in accordance with an embodiment of the invention.

FIG. 36B depicts an isometric view of an exemplary exterior mounting gusset 3502 in accordance with an embodiment of the invention.

FIG. 36C depicts an isometric view of an exemplary exterior mounting rib 3503 in accordance with an embodiment of the invention.

FIG. 37 depicts an isometric view of an exemplary rubber insert 3402 in accordance with an embodiment of the invention.

FIGS. 38A and 38B depict top and side views of an exemplary base strap assembly 3403 in accordance with an embodiment of the invention. Referring to FIG. 38A, the base strap assembly 3403 comprises a straight shape end mounting plate 3801, a nylon strap 3802, and a female buckle 3803.

FIGS. 39A and 39B depict isometric and side views of an exemplary upper strap assembly 3203 in accordance with an embodiment of the invention. Referring to FIGS. 39A and 39B, the upper strap assembly 3203 comprises an upper strap mount 3901, an upper stabilator strap assembly 3902, a flat head machine screw 703, and a nylon-insert locknut 3404. The upper strap assembly 3203 attaches to a side support 102 using a quick-pin 116, a lanyard/wire rope/loop-tab assembly 119, a pan head machine screw 120, and a flat washer 121.

FIG. 40A depicts an isometric view of an exemplary upper strap mount 3901 in accordance with an embodiment of the invention.

FIGS. 40B and 40C depict side and top views of an exemplary upper stabilator strap assembly 3902 in accordance with an embodiment of the invention. The upper stabilator strap assembly 3902 comprises a nylon strap 4001, a male buckle 4002, and a strap end mounting plate 4003.

FIGS. 41A and 41B depict isometric views of an exemplary interior bracket assembly 3204 in accordance with an embodiment of the invention. The interior bracket assembly 3204 comprises an interior bracket 4101, an interior rubber insert 4102, a flat head machine screw 703, a nylon-insert locknut 3404, and a base strap assembly 3403.

FIGS. 42A-C depict isometric, end, and side views of an exemplary interior bracket 4101 in accordance with an embodiment of the invention. The interior bracket 4101 comprises an interior bracket 4201, two mounting gussets 3502, and two interior mounting ribs 4203.

FIG. 43A depicts an isometric view of an exemplary interior stabilator mounting bracket 4201 in accordance with an embodiment of the invention.

FIG. 43B depicts an isometric view of an exemplary interior mounting rib 4203 in accordance with an embodiment of the invention.

FIG. 44 depicts an isometric view of an exemplary base shelving assembly 3205 in accordance with an embodiment of the invention. Referring to FIG. 44, the base shelving assembly 3205 comprises a base shelf 4401 and a shelf rubber 4403 (e.g., Buna-N-Foam). Also shown in FIG. 44 are two quick release pins 116, two lanyard/wire rope/loop-tab assemblies 119, two pan head machine screws 120, and two flat washers 121 that are used to attach the base shelving assembly 3205 to the bottom frame tubing 129.

FIG. 45 depicts an isometric view of an exemplary secondary base shelving assembly 3206 in accordance with an embodiment of the invention. Referring to FIG. 45, the secondary base shelving assembly 3206 is just like the base shelving assembly 3205 of FIG. 44 except it has a secondary base shelf 4501 in place of the base shelf 4401 used in the base shelving assembly 3205.

FIG. 46A-46C depict isometric, end, and side views of an exemplary drive shaft and tail rotor configured cart assembly 4600 in accordance with a third embodiment of an embodiment of the invention. The drive shaft and tail rotor configured cart assembly 4600 comprises an A-frame cart 100, two top drive shaft mount assemblies 4602, twenty exterior shaft bracket assemblies 4603, and eight interior tail rotor assemblies. It should be noted that the bottom plungers 126 and the top plungers 303 of the moveable side support arm are configured to provide support independent of each other, where the bottom plungers 126 have been rotated 180° such that angle outwards from the drive shaft and tail rotor configured cart assembly 4600. Shown stored in the cart assembly 4600 are small drive shaft assemblies 4610, shafts 4612, large drive shaft assemblies 4614, rotary wing blades 4616, and fan shaft assemblies 4618. Seen in FIG. 46A is a circled area A, which is depicted in FIG. 47A. Seen in FIG. 46B is a circled area B, which is depicted in FIG. 47B.

FIGS. 47A and 47B depict enlarged views of the circled areas A and B of FIGS. 46A and 46B, respectively. Referring to FIG. 47A, a top drive shaft mount assembly 4602 is shown attached to top structure 101. Referring to FIG. 47B, exterior shaft bracket assemblies 4603 and an interior tail rotor assembly 4604 are attached to a side support 102 using quick release pins 116 that are attached to lanyard/wire rope/loop tab assemblies 119 using pan head machine screws 120 and flat washers 121 in a manner like that shown in FIG. 2A.

FIG. 48 depicts an isometric view of an exemplary top drive shaft mount assembly 4602 in accordance with an embodiment of the invention. Referring to FIG. 48, top drive shaft mount assembly 4602 comprises a top drive shaft mount 4801, two rubber inserts 3402, an upper drive shaft strap assembly 4803, a base strap assembly 3403, two flat head machine screws 4810, and two nylon-insert locknuts 3404. The top drive shaft mount assembly 4602 attaches to the top structure 101 at four locations using a quick-pin 116, a lanyard/wire rope/loop-tab assembly 119, a pan head machine screw 120, and a flat washer 121 at each location.

FIG. 49 depicts an isometric view of an exemplary top drive shaft mount 4801 in accordance with an embodiment of the invention. Referring to FIG. 49, top drive shaft mount 4801 comprises two top shaft mounting plates 5001, two support plates 5002, and four top support braces 5003.

FIG. 50A depicts an isometric view of an exemplary top drive mounting plate 5001 in accordance with an embodiment of the invention.

FIG. 50B depicts an isometric view of an exemplary support plate 5002 in accordance with an embodiment of the invention.

FIG. 50C depicts an isometric view of an exemplary top support brace 5003 in accordance with an embodiment of the invention.

FIGS. 51A and 51B depict side and top views of an exemplary upper drive shaft strap assembly 4803 in accordance with an embodiment of the invention. The upper drive shaft strap assembly 4803 comprises a nylon strap 4001, a male buckle 4002, and a strap end mounting plate 4003 and is a shorter version of the upper stabilator strap assembly 3902 described in relation to FIGS. 40A-40C.

FIGS. 52A and 52B depict isometric views of an exemplary exterior shaft bracket assembly 4603 in accordance with an embodiment of the invention. The exterior shaft bracket assembly 4603 comprises an exterior shaft bracket 5201, a rubber insert 3402, a strap tab 5203, a strap retainer 5204, a replacement strap 5205, and two flat head metal screws 4810. The exterior shaft bracket assembly 4603 is attached to a side support 102 using a quick-pin 116, a lanyard/wire rope/loop-tab assembly 119, a pan head machine screw 120, and a flat washer 121.

FIG. 53A depicts an isometric view of an exemplary exterior shaft bracket 5201 in accordance with an embodiment of the invention.

FIG. 53B depicts an isometric view of an exemplary strap tab 5203 in accordance with an embodiment of the invention.

FIG. 53C depicts an isometric view of an exemplary strap retainer 5204 in accordance with an embodiment of the invention.

FIGS. 54A and 54B depict isometric views of an exemplary interior tail rotor assembly 4604 in accordance with an embodiment of the invention. The interior tail rotor assembly 4604 comprises an interior tail rotor bracket assembly 5401, a rubber insert 3402, two flat head machine screws 4810, two nylon-insert locknuts 3404, a base strap assembly 3403, and a tail rotor strap assembly 5506. The interior tail rotor assembly 4603 is attached to a side support 102 using a quick-pin 116, a lanyard/wire rope/loop-tab assembly 119, a pan head machine screw 120, and a flat washer 121.

FIGS. 55A and 55B depict an isometric and an end view of an exemplary interior tail rotor bracket assembly 5401 in accordance with an embodiment of the invention. The interior tail rotor bracket assembly 5401 comprises an interior tail rotor bracket 5501 and two mounting gussets 3502.

FIG. 56 depicts an isometric view of an exemplary interior tail rotor bracket 5501 in accordance with an embodiment of the invention.

FIGS. 57A and 57B depict side and top views of an exemplary tail rotor strap assembly 5506 in accordance with an embodiment of the invention. The tail rotor strap assembly 5506 comprises a nylon strap 4001, a male buckle 4002, and a strap end mounting plate 4003 and is a shorter version of the upper stabilator strap assembly 3902 described in relation to FIGS. 40A-40C and a slightly longer version of the drive shaft strap assembly 4803 of FIGS. 51A and 51B.

Under one arrangement, an A-frame cart 100 includes one or more attachment mechanisms (e.g., a trailer hitch and ball) for attaching one cart 100 to another cart 100 and/or allowing a cart to be attached to a vehicle (e.g., a fork lift). An attachment mechanism could be configured to pivot where it is attached to the cart 100. An A-frame cart might be configured with a winch mechanism.

Under another arrangement enclosed compartments can be attached to the cart 100 and used for storage of components.

Under still another arrangement the top portion of the cart (i.e., the top frame) could be configured to be capable of spreading apart so as to allow a component to be lowered into the interior of the cart 100. Similarly, the bottom portion of the cart could be configured to be able to capable of spreading apart so as to allow the cart to roll across and straddle a component prior to the bottom portion being secured. The cart could comprise pulleys and associated cabling.

Under a further arrangement, fixed panels can be attached to the cart 100 in various configurations to provide shelving, to constrain movement of stored components, to provide additional attachment locations (e.g., peg board), or to serve some other desired purpose. Similarly, flexible materials such as tarps, netting, and the like can be attached to the cart in various configurations to constrain movement of stored components, to provide additional attachment locations, or to serve other desired purposes. Generally, many different forms of attachment such as bungee cords, Velcro, ropes, magnets, adhesives, hooks, snaps, knobs, nuts and bolts, and the like can be used to secure objects to the cart 100. Moreover, many different well known methods for reducing friction between parts of the cart 100, reducing noise, increasing or decreasing visibility, and the like can be employed, as appropriate.

Under yet another arrangement, the A-frame cart 100 is equipped with a communications apparatus (e.g., a transmitter and/or receiver) for communicating its position or the status of one or more components stored on the cart 100.

It will be understood that the above description of the present invention is susceptible to various modifications, changes and adaptations, and the same are intended to be comprehended within the meaning and range of equivalents of the appended claims, an embodiment of the invention an embodiment of the invention.

What is claimed is:

1. An extendible and collapsible apparatus that supports attachable components, the apparatus comprising:
   a top structure including at least one extendable top member, the extendable top member defining a minimum length of the apparatus in a longitudinal retracted position and a maximum length of the apparatus in a longitudinal extended position;
   a front structure coupled to the top structure, the front structure including
      a first front side support,
      a second front side support, and
      an extendable front cross-support to couple the first and second side supports together, the extendable cross-support defining a minimum width of the apparatus in a lateral retracted position and a maximum width of the apparatus in a lateral extended position, wherein extension or retraction of the extendable front cross-support changes an angle of orientation of the first front side support relative to the second front side support;
   a bottom structure coupled to the front structure and opposed to the top structure, the bottom structure including at least one extendable bottom member, the extendable bottom member to correspond in length with the extendable top member; and
   a rear structure coupled to the top structure and bottom structure, the rear structure including
      a first rear side support,
      a second rear side support, and
      an extendable rear cross-support to couple the first and second rear side supports together, wherein extension or retraction of the extendable rear cross-support changes an angle of orientation of the first rear side support relative to the second rear side support, wherein the first rear side support, the second rear side support, and the extendable rear cross-support correspond to positions of the first front side support, second front side support, and extendable front cross-support, respectively.

2. The apparatus according to claim 1, further comprising a support arm attachable to the top structure and the bottom structure, wherein the support arm provides secondary support to the apparatus.

3. The apparatus according to claim 2, wherein the support arm includes a plunger spring system to attach the support arm to the top and bottom structures.

4. The apparatus according to claim 2, wherein the support arm comprises a plurality of mounting holes to receive a bracket.

5. The apparatus according to claim 1, wherein the first front side support, the second front side support, the first rear side support, and the second rear side support comprise a plurality of mounting holes to receive a respective amount of brackets.

6. The apparatus according to claim 5, further comprising a locking device that attaches a bracket to the first front side support, the second front side support, the first rear side support, or the second rear side support.

7. The apparatus according to claim 1, wherein the bottom structure includes at least one moving device to enable movement of the apparatus.

8. The apparatus according to claim 1, wherein the extendable front cross-support, extendable rear cross-support, extendable top member, and extendable bottom member each comprise
   a first tubing, and
   a second tubing, wherein the first tubing is insertable into a second tubing.

9. The apparatus according to claim 8, wherein the first and second tubing have different cross sections or diameters.

10. The apparatus according to claim 8, wherein the extendable front cross-support, extendable rear cross-support, extendable top member, and extendable bottom member each further comprise a locking device to lock and unlock the first tubing to the second tubing.

11. The apparatus according to claim 10, wherein the locking device comprises a quick-release pin.

12. The apparatus according to claim 1, wherein the apparatus comprises a stand or an A-Frame cart.

13. An extendible and collapsible apparatus that supports attachable components, the apparatus comprising:
   an extendable top structure defining a minimum length of the apparatus in a longitudinal retracted position and a maximum length of the apparatus in a longitudinal extended position;
   a front structure coupled to the top structure, the front structure including an extendable front cross-support defining a minimum width of the apparatus in a lateral retracted position and a maximum width of the apparatus in a lateral extended position, wherein extension or retraction of the extendable front cross-support changes an angle of orientation of one or more side supports;
   an extendable bottom structure coupled to the front structure, the extendable bottom structure to correspond in length with the extendable top structure; and
   a rear structure coupled to the top structure and bottom structure, the rear structure including an extendable rear cross-support that corresponds to the position of the extendable front cross-support.

* * * * *